(12) United States Patent
Dawson

(10) Patent No.: US 7,663,642 B2
(45) Date of Patent: *Feb. 16, 2010

(54) SYSTEMS AND METHODS FOR RENDERING A POLYGON IN AN IMAGE TO BE DISPLAYED

(75) Inventor: Thomas Patrick Dawson, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 696 days.

This patent is subject to a terminal disclaimer.

(21) Appl. No.: 11/329,198

(22) Filed: Jan. 9, 2006

(65) Prior Publication Data

US 2006/0109280 A1    May 25, 2006

Related U.S. Application Data

(60) Continuation-in-part of application No. 10/941,234, filed on Sep. 14, 2004, now Pat. No. 7,034,846, which is a division of application No. 10/441,630, filed on May 19, 2003, now Pat. No. 6,933,951, which is a continuation-in-part of application No. 09/713,070, filed on Nov. 15, 2000, now Pat. No. 6,567,099.

(51) Int. Cl.
*G09G 5/00* (2006.01)
(52) U.S. Cl. .................. 345/611; 345/422; 345/423; 345/546; 345/549; 345/581; 345/605; 345/614; 382/299
(58) Field of Classification Search .............. None
See application file for complete search history.

(56) References Cited

U.S. PATENT DOCUMENTS 5,438,656 A    8/1995  Valdes et al.

(Continued)

OTHER PUBLICATIONS

Lau et al., "An Anti-Aliasing Method for Parallel Rendering", Computer Graphics International, 1998, Proceedings, pp. 228-235.

*Primary Examiner*—Antonio A Caschera
(74) *Attorney, Agent, or Firm*—Steven L. Nichols; Rader, Fishman & Grauer PLLC

(57) ABSTRACT

Polygon rendering systems for rendering a polygon in an image to be displayed include a rasterizer unit, a first memory buffer, and one or more additional memory buffers. The rasterizer unit is configured to generate one or more low resolution fragments representing a portion of the polygon at a low resolution and one or more high resolution fragments representing a portion of the polygon at one or more higher resolutions. The first memory buffer is configured to store the low resolution fragments as pixels. The first memory buffer is further configured to store data based on the one or more high resolution fragments. The one or more additional memory buffers are configured to store the high resolution fragments as high-resolution sub-pixels. Methods of rendering a polygon in an image to be displayed include generating one or more low resolution fragments that represent a portion of the polygon at a low resolution and one or more high resolution fragments that represent a portion of the polygon at one or more higher resolutions, storing the low resolution fragments as pixels and data based on the one or more high resolution fragments in a first memory buffer, and storing the high resolution fragments as high resolution sub-pixels in one or more additional memory buffers.

48 Claims, 22 Drawing Sheets

U.S. PATENT DOCUMENTS

| | | |
|---|---|---|
| 5,528,737 A | 6/1996 | Safarti |
| 5,728,949 A | 3/1998 | McMillan et al. |
| 5,815,166 A | 9/1998 | Baldwin |
| 5,862,257 A | 1/1999 | Sekine et al. |
| 5,880,737 A | 3/1999 | Griffin et al. |
| 5,977,987 A | 11/1999 | Duluk, Jr. |
| 5,995,121 A | 11/1999 | Alcorn et al. |
| 5,999,189 A | 12/1999 | Kajiya et al. |
| 6,005,580 A | 12/1999 | Donovan |
| 6,008,820 A | 12/1999 | Chauvin et al. |
| 6,201,545 B1 | 3/2001 | Wong et al. |
| 6,429,877 B1 | 8/2002 | Stroyan |
| 6,828,983 B1 * | 12/2004 | Vijayakumar et al. ....... 345/613 |
| 6,982,723 B1 * | 1/2006 | Szymaniak .................. 345/611 |
| 7,034,846 B2 * | 4/2006 | Dawson ...................... 345/611 |
| 2002/0085000 A1 | 7/2002 | Sullivan et al. |
| 2002/0145611 A1 | 10/2002 | Dye et al. |
| 2003/0095134 A1 | 5/2003 | Tuomi et al. |

* cited by examiner

| Bit Flag | Color Data | Z-Distance |
|----------|------------|------------|
| Bit Flag | Color Data | Z-Distance |
| Bit Flag | Color Data | Z-Distance |
| Bit Flag | Color Data | Z-Distance |

*Fig. 5A*

| ... | ... | ... |
|-----|-----|-----|
| ... | ... | ... |
| ... | ... | ... |
| ... | ... | ... |
| 1 | color data | Z-distance |
| 0 | data ignored | data ignored |
| 1 | color data | Z-distance |
| 1 | color data | Z-distance |
| 0 | data ignored | data ignored |
| 0 | data ignored | data ignored |
| 1 | color data | Z-distance |
| 0 | data ignored | data ignored |
| ... | ... | ... |
| ... | ... | ... |
| ... | ... | ... |
| ... | ... | ... |

*Fig. 5B*

| | | |
|---|---|---|
| 1 | color data | Z-distance |
| 1 | color data | Z-distance |
| 0 | data ignored | data ignored |
| 0 | data ignored | data ignored |
| 1 | color data | Z-distance |
| 1 | color data | Z-distance |
| 1 | color data | Z-distance |
| 0 | data ignored | data ignored |
| 1 | color data | Z-distance |
| 1 | color data | Z-distance |
| 1 | color data | Z-distance |
| 1 | color data | Z-distance |
| 1 | color data | Z-distance |
| 1 | color data | Z-distance |
| 1 | color data | Z-distance |
| 1 | color data | Z-distance |

*Fig. 8*

| Z-Distance | Bit Flag Mask |
|---|---|
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||

*Fig. 9A*

SYSTEMS AND METHODS FOR RENDERING A POLYGON IN AN IMAGE TO BE DISPLAYED

RELATED APPLICATIONS

The present application is a continuation-in-part and claims priority under 35 U.S.C. §120 of U.S. patent application Ser. No. 10/941,234, filed Sep. 14, 2004, now U.S. Pat. No. 7,034,846 which application is a divisional of U.S. patent application Ser. No. 10/441,630, filed May 19, 2003, which is now U.S. Pat. No. 6,933,951, issued Aug. 23, 2005, which application is a continuation-in-part of U.S. patent application Ser. No. 09/713,070, filed Nov. 15, 2000, which is now U.S. Pat. No. 6,567,099, issued May 20, 2003. The above-listed applications and patents, respectively, are incorporated herein by reference in their entireties.

BACKGROUND

Electronic display devices, such as computer monitors and television sets, display images, objects and scenes which are made up of a large number of pixels. Pixels are rectangular dots arranged in an array on the screen of the display monitor. In a color display, each pixel is defined by a particular color. The color of the pixel is usually specified as a color triplet, i.e. three numbers representing a red, green and blue component of the pixel's color. When properly arranged and viewed as a whole, the pixels form the image, object or scene being displayed. A printed image may also be formed of pixels.

Because pixels have a rectangular shape, it can be difficult to represent a diagonal or curved edge of an object without giving that edge a stair-stepped or jagged appearance. Anti-aliasing is term that describes a variety of techniques which are used to smooth the appearance of a diagonal or curved edge which must be rendered on a print medium or on an electronic display using rectangular pixels.

The basic idea behind anti-aliasing involves altering the pixels along such a curved or diagonal edge to a color between that of the color inside and outside the edge. The edge thus appears much smoother that would be the case otherwise. An example of this type of anti-aliasing is provided by black text characters (which have diagonal and curved edges) on a white background. Without anti-aliasing, diagonal edges appear jagged, like staircases, which may be noticeable, particularly on a low resolution display.

However, if the display can show intermediate shades of gray, then anti-aliasing can be applied. For example, a pixel will be black if it is completely within one of the text characters, white if it is completely within the background, or an intermediate shade of gray according to the proportions of the pixel which overlap the black and white areas. The same technique works similarly with other foreground and background colors.

A common implementation of anti-aliasing involves electronically rendering the entire image at a resolution higher than that of the final output provided to the display monitor. A weighted resampling is then performed on the image data to reduce the resolution of the image. The resampling reduces the resolution to that specified for output to the display monitor.

While providing an anti-aliasing effect, this technique is, however, inefficient. For example, all parts of the image are subject to the anti-aliasing process, when anti-aliasing need only be performed on pixels depicting edges within the image. This technique also increases the time required to render an image because the entire image must be created at a higher resolution and then redacted for output. Additional cost is incurred to supply the extra memory required to hold the higher resolution image data during processing.

Another anti-aliasing technique adds extra information for each pixel within the displayed image. This additional information includes a flag for each pixel situated on an edge of an object within the displayed image and specifies a sub-pixel geometry for the object or objects of which that pixel is a part.

While, this technique provides an anti-aliasing effect, it is still highly inefficient. For example, in order to accommodate the extra information that may be associated with any pixel, the system's data buffer, called a Z-buffer, must be greatly expanded into an anti-aliasing buffer or A-buffer.

A traditional prior art Z-buffer is a fixed set of memory where there is a color, some number of control flags and a Z-distance value kept for every pixel location on the display screen. When data defining a particular fragment of a polygon arrives from a rendering engine (e.g., a rasterizer or a texture unit), it has a specific pixel location it is assigned to that is correlated to a specific memory location in the Z-buffer. If that location does not yet have a fragment assigned then the incoming data is placed in the Z-buffer at that location. In the case where data for a fragment associated with a particular pixel is received in the Z-buffer and data for another fragment associated with that same pixel has already been stored in the Z-buffer, then the Z values of the incoming fragment and the current location contents are compared. If the incoming fragment has a Z distance that is greater than the current entry in the Z-buffer, the incoming data is discarded or ignored. If the incoming fragment has a smaller Z-distance, the data of the incoming fragment replaces the current Z-buffer entry for that pixel. The result for equal Z values is usually controllable through a register setting.

A Z-buffer may also support partial transparency in the displayed image by applying rules that define how an incoming fragment may or may not be blended with the current Z-buffer contents. If the Z-buffer supports partial transparency then there is an extra bit and a transparency level value added to each fragment and each Z-buffer location to indicate whether transparency is being applied and what the blending level is.

The difference between an A-buffer and a Z-buffer is that an A-buffer keeps stacks of fragment data at edge locations and a Z-buffer does not. Regardless of the number of edge fragments applied, the "depth" of the Z buffer at a particular location does not change. In contrast, an A-buffer provides enough memory space for the data of each pixel to accommodate all the data described above. If that pixel is situated on an edge within the displayed image, it has additional Z-distance and sub-pixel geometry information for each underlying polygon fragment(s). In an A-buffer, each edge pixel location may have an entire stack of polygonal fragments associated therewith, for which data must be stored.

Some implementations of A-buffers do not perform an entire sub-sampling of the sub-pixel geometry and seams may occur. In such implementations, it may be necessary to draw all the objects on the display monitor twice in an attempt to eliminate these seams. This frequently results in visual artifacts on the screen, i.e., ghost images that are not intended as part of the displayed image. A high-quality A-buffer can eliminate these problems with visual artifacts, but incurs the cost of maintaining the exact sub-pixel geometry for each fragment of the objects being displayed. Such a high-quality A-buffer, and the complexity of the control mechanisms required to operate it, add excessively to the expense of the system.

SUMMARY

Polygon rendering systems for rendering a polygon in an image to be displayed include a rasterizer unit, a first memory buffer, and one or more additional memory buffers. The rasterizer unit is configured to generate one or more low resolution fragments representing a portion of the polygon at a low resolution and one or more high resolution fragments representing a portion of the polygon at one or more higher resolutions. The first memory buffer is configured to store the low resolution fragments as pixels. The first memory buffer is further configured to store data based on the one or more high resolution fragments. The one or more additional memory buffers are configured to store the high resolution fragments as high-resolution sub-pixels.

Methods of rendering a polygon in an image to be displayed include generating one or more low resolution fragments that represent a portion of the polygon at a low resolution and one or more high resolution fragments that represent a portion of the polygon at one or more higher resolutions, storing the low resolution fragments as pixels and data based on the one or more high resolution fragments in a first memory buffer, and storing the high resolution fragments as high resolution sub-pixels in one or more additional memory buffers.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 5A is a table that illustrates an exemplary organizational structure of a cluster of sub-pixel data in the high resolution buffer according to principles described herein.

FIG. 5B is a chart illustrating data fields in a segment of the high resolution buffer for a two by two array of sub-pixels according to principles described herein.

FIG. 8 is a chart illustrating the data fields in a segment of the high resolution buffer for a four by four array of sub-pixels according to principles described herein.

FIG. 9A is a table that illustrates an additional exemplary organizational structure of a cluster of sub-pixel data in the high resolution buffer according to principles described herein.

Throughout the drawings, identical reference numbers designate similar, but not necessarily identical, elements.

DETAILED DESCRIPTION

Systems and methods for rendering a polygon in an image to be displayed are disclosed herein. A rasterizer unit is configured to generate one or more low resolution fragments representing a portion of the polygon at a low resolution and one or more high resolution fragments representing a portion of the polygon at one or more higher resolutions. A first memory buffer is configured to store the low resolution fragments as pixels. The first memory buffer is also configured to store data based on the one or more high resolution fragments. One or more additional memory buffers are configured to store the high resolution fragments as high resolution sub-pixels.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment.

The appearance of the phrase "in one embodiment" in various places in the specification are not necessarily all referring to the same embodiment.

In an image display or printing system, particularly where the image is rendered, generated or processed using a computer, the image may be represented in the memory of the computer as a number of geometric data, i.e., polygonal shapes or frameworks to which particular textures are then applied to complete the image as the image is displayed or printed. Consequently, as the geometric data is retrieved or generated by the computer, it must be processed through a geometric data processing system that interprets the polygonal and texture data to render the completed image. Such a system is illustrated in FIG. 1A.

Figure 1A:
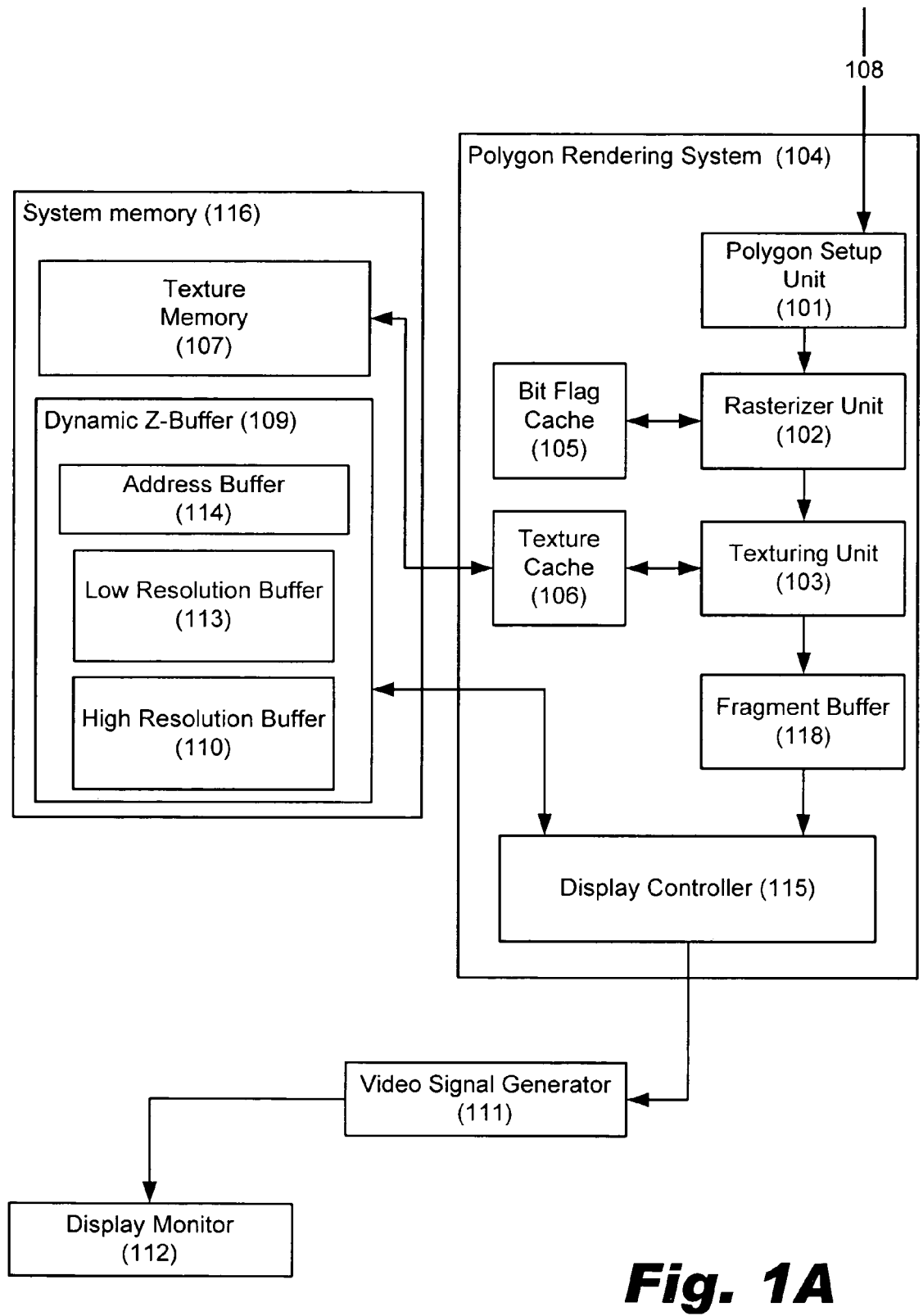
FIG. 1A is a block diagram illustrating an exemplary polygon rendering system according to principles described herein.

FIG. 1A illustrates a portion of an image rendering system associated with, for example, a display monitor (112). As will be understood by those skilled in the art, the elements of FIG. 1A include a combination of hardware and software elements, where some of the elements may be embodied as either, or as firmware depending on the needs and design considerations of a particular implementation.

As shown in FIG. 1A, geometric and texture data (108) for a polygon to be rendered is received from a host computer or other system that has retrieved or generated the geometric data. This data is received by a polygon rendering system (104). As shown in the exemplary image processing system of FIG. 1A, the polygon rendering system (104) includes a polygon setup unit (101), a rasterizer unit (102), and a texturing unit (103). The polygon rendering system (104) may have additional components beyond those shown in FIG. 1A, such as a Z-distance fog unit. The components comprising the polygon rendering system (104) may be discrete components or they may be all integrated into one component, such as an application specific integrated circuit (ASIC), field-programmable gate array (FPGA), digital signal processor (DSP), or some other type of integrated circuit (IC), for example. If the components comprising the polygon rendering system (104) are discrete components, then they may also be ASICs, FPGAs, DSPs, or some other type of IC.

The polygon rendering system (104) may include system memory (116), as shown in FIG. 1A. The system memory (116) may include texture memory (107) and a dynamic Z-buffer (109). These memory components will be described in more detail below. The system memory (116) may or may not be separate from the memory used by a host computer's central processing unit (CPU), depending on the implementation architecture.

The polygon setup unit (101), operating on principles known in the art, reformats the geometric data (108) into an input form required by the rasterizer unit (102). The texturing unit (103), also operating on principles known in the art, adds additional texture data to the generated fragments as textures specified in the geometric data signal (108). The texturing unit (103) operates by reading texels (bits of texture data) from the appropriate textures for a particular image from a texture database or memory (107) and applying them to the fragment data as ordered. A texture cache (106) may be used to temporarily store data used in the texturing process.

The formatted geometric data is rasterized by the rasterizer unit (102). The rasterizer unit (102) may be a discrete component or it may be integrated into the polygon rendering system's (104) IC. The rasterizer unit (102) is configured to process the geometric data and output a number of fragments that represent different geometrical portions of the polygon. Each fragment corresponds to a pixel location in the final image to be displayed and, as will be described in more detail below, may include color data and Z-distance data. Once generated, each fragment may be temporarily stored in a fragment buffer (118).

In some embodiments, the rasterizer unit (102) determines whether the incoming geometric data corresponding to a particular pixel location defines an edge of the polygon being rendered. If the geometric data does define an edge of the polygon, the rasterizer unit (102) may be configured to generate and output multiple higher resolution fragments to represent the polygon at the particular pixel location. This higher resolution data is stored within the high resolution buffer (110), as will be described in more detail below. In this manner, as will be described in more detail below, anti-aliasing of the edges of the polygons may be effected.

After the rasterizer unit (102) converts the geometric data into fragments, the fragments are output to the texture unit (103), which may pass them on to other stages before they are finally passed to a dynamic Z-buffer (109). A display controller (115) scans the contents of the Z-buffer (109) and outputs the data to a video signal generator (111). The display controller (115) may be included within an ASIC, FPGA, DSP, or some other type of IC. It may additionally or alternatively be integrated into the polygon rendering system's (104) IC. In some examples, the display controller (115) works in parallel with the rasterizer unit (102). The particular data that the display controller (115) outputs to the video signal generator (111) will be described in more detail below.

The video signal generator (111) then uses the data to generate a video signal which is output to a display monitor (112). The display monitor (112) uses the video signal to render a desired image on a display screen of the display monitor (112). The video signal generator (111) and display monitor (112) are only examples of display circuitry that may be connected to the polygon rendering system (104). It will be recognized that many other types of display circuitry may be used as best serves a particular application. As used herein and in the appended claims, unless otherwise specifically denoted, "display circuitry" will refer to any device that is configured to receive the output of display controller (15) such as a video signal generator (111) attached to a display monitor (112) or a printer, for example.

In some examples, the polygon rendering system (104) and Z-buffer (109) are used to anti-alias the edges of the polygons, or objects, before the data is output to the video signal generator (111). This is accomplished as follows.

In some examples, the rasterizer unit (102) communicates with a bit flag cache (105) that holds a resolution bit word that corresponds to each pixel location on the screen of the display monitor (112). The resolution bit word may have any suitable length. For example, the resolution bit word may include only one bit when the anti-aliasing system is configured to only render a pixel at a low resolution or at a high resolution. A one bit resolution bit word will be referred to herein as a "resolution bit." However, as will be explained in more detail below, the bit word may include multiple bits when the anti-aliasing system is configured to selectively render a pixel to be displayed at a particular pixel location at any of a number of different resolutions. In the following example, for illustrative purposes only, a resolution bit equal to "0" indicates that a low resolution pixel is to be rendered in its corresponding pixel location and a resolution bit equal to "1" indicates that a high resolution pixel is to be rendered in its corresponding pixel location.

Before each polygon is rendered, each of the resolution bit words in the bit flag cache (105) is initialized to contain a "0" value. Each time the rasterizer unit (102) generates multiple high resolution fragments to represent the polygon at a particular pixel location (i.e., when the incoming geometric data corresponds to an edge of the polygon), the rasterizer unit (102) changes the resolution bit word in the bit flag cache (105) corresponding to that pixel location to a "1." However, each time the rasterizer unit (102) generates a single low resolution fragment to represent the polygon at a particular pixel location (i.e., when the incoming geometric data corresponds to a non-edge portion of the polygon), the rasterizer unit (102) does not change the resolution bit word in the bit flag cache (105) corresponding to that pixel location.

After the low resolution fragment or group of high resolution fragments corresponding to a particular pixel location is generated, it is stored in the dynamic Z-buffer (109). The resolution bit word corresponding to the pixel location is also stored in the Z-buffer (109). In some embodiments, the fragments and/or resolution bit word are communicated to the Z-buffer (109) via the display controller (115).

When a low resolution fragment or group of high resolution fragments and a corresponding resolution bit word are communicated to the Z-buffer (109), the display controller (115) detects the value of the resolution bit word. If the resolution bit is set to "0," the display controller (115) stores the low resolution fragment and its associated resolution bit in a location associated with the particular pixel location in a memory buffer, referred to herein and in the appended claims, unless otherwise specifically denoted, as a low resolution buffer (113). The low resolution buffer (113) includes one or more fields corresponding to each pixel location in the display screen (112). As will be described in more detail below, the display controller (115) scans the data stored in the low resolution buffer (113) and outputs the data as pixels that are displayed by the display screen (112). The low resolution buffer (113) may be a designated portion of the Z-buffer (109) structure, as shown in FIG. 1A, or it may be a separate memory buffer.

However, if the resolution bit is set to "1," the display controller (115) allocates additional memory in an additional memory buffer referred to herein and in the appended claims, unless otherwise specifically denoted, as a high resolution buffer (110). The high resolution buffer (110) is used to store the group of high resolution fragments and, in some examples, its associated resolution bit. The high resolution buffer (110) may be a designated portion of the Z-buffer (109) structure, as shown in FIG. 1A, or it may be a separate memory buffer.

As mentioned, the low resolution buffer (113) is configured to store low resolution fragments as pixels and their corresponding resolution bit words. The pixel data may include color data and Z-distance data. The color data may include a color triplet value, for example, which specifies the color of the pixel. The color triplet value may be in any suitable format. For example, the color triplet value may be formatted in a red, green, and blue (RGB) format. Additionally or alternatively, the color triplet value may be formatted in a Luminance-Bandwidth-Chrominance (YUV) format. The Z-distance value specifies the distance of the fragment from the view plane.

The low resolution buffer (113) is additionally configured to store a memory offset value for each group of high resolution pixels stored in the high resolution buffer (110). Each memory offset value gives the location in the high resolution buffer (110) of the corresponding group of high resolution pixels. The memory offset values are determined by the display controller (115) as locations in the high resolution buffer (110) are allocated. As will be described in more detail below, in some examples, the memory offset value is stored in the field normally allocated to the Z-distance data.

As noted above, the high resolution buffer (110) stores groups of high resolution fragments as high resolution sub-pixels. Each high resolution sub-pixel has its own color data. Hence, as will be described in more detail below, the color data of each high resolution sub-pixel in a particular group of high resolution sub-pixels may be averaged to render a pixel on the display screen (112) at a sub-pixel resolution. A sub-pixel is a portion of a pixel.

Moreover, each group of high resolution sub-pixels may include any number of high resolution sub-pixels as best serves a particular application. For example, an exemplary group of high resolution sub-pixels may include, but is not limited to, four, eight, or sixteen sub-pixels. These sub-pixels are arranged in any N by M array. For example, a group of four sub-pixels may be arranged in a two by two array of sub-pixels that are used to render a pixel at a two by two sub-pixel resolution. A group of sixteen sub-pixels may be arranged in a four by four array of sub-pixels that are used to render a pixel at a four by four sub-pixel resolution. In general, a group of N*M sub-pixels may be arranged in an N by M array to render a pixel at an N by M sub-pixel resolution.

Figure 2:
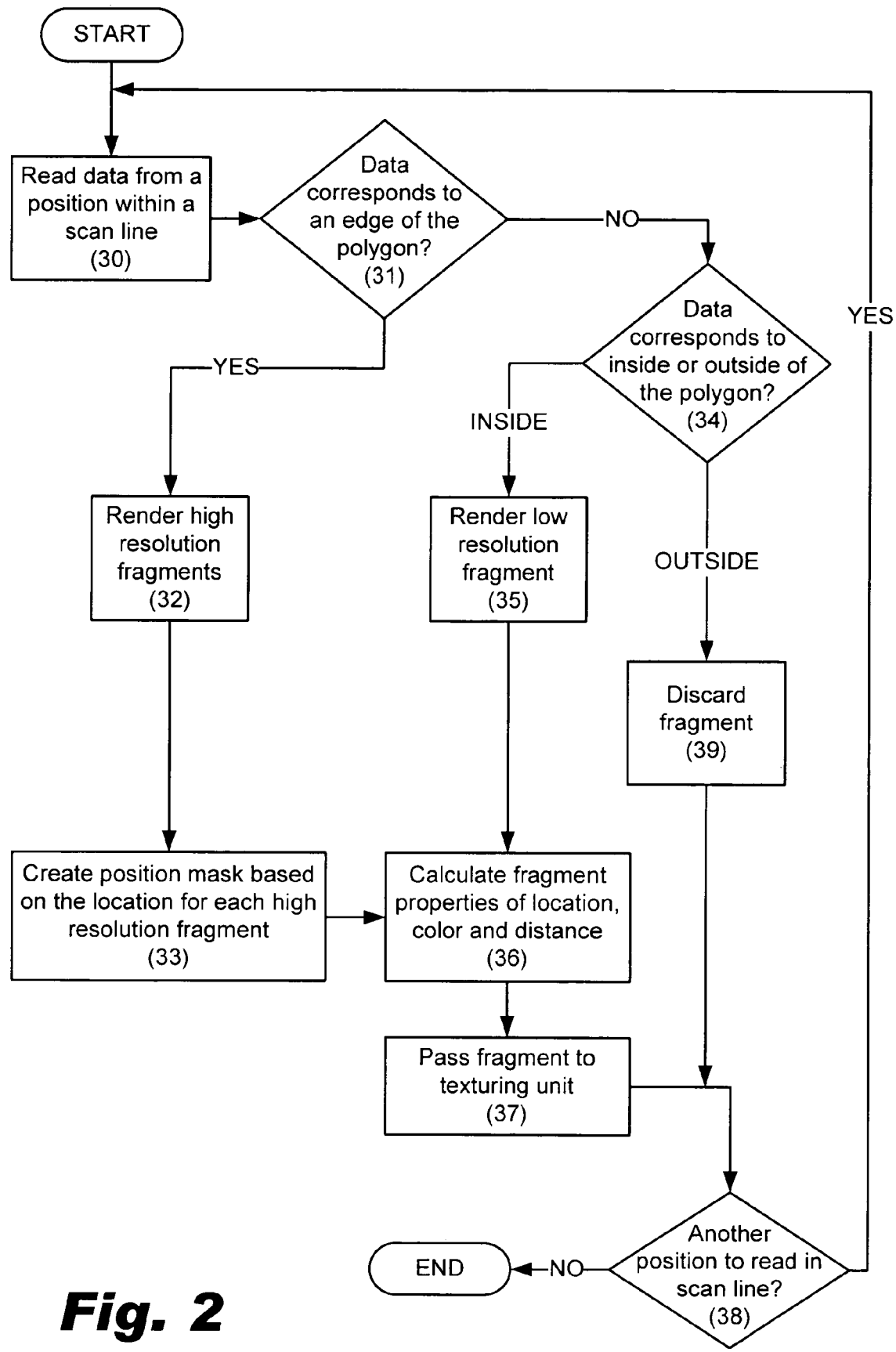
FIG. 2 is a flow chart illustrating an exemplary rasterization process whereby edge fragments are rendered at a low resolution or at a high resolution according to principles described herein.

FIG. 2 is a flow chart illustrating an exemplary method of generating fragments at two resolutions. The steps shown in FIG. 2 may performed by a processor or the like via a set of computer readable instructions. The steps described in FIG. 2 are exemplary and may be modified as best serves a particular application. Furthermore, the steps described in connection with FIG. 2 may be processed in any order.

As shown in FIG. 2, data from a position within a scan line of geometric data representing the polygon is first read by the rasterizer unit (102; FIG. 1A) (step 30). The rasterizer unit (102; FIG. 1A) then determines whether the read data corresponds to an edge of the polygon (step 31). If it does (Yes; step 31), the process moves to step 32. However, if the rasterizer unit (102; FIG. 1A) determines that the data does not correspond to an edge of the polygon (No; step 31), the rasterizer unit (102; FIG. 1A) then determines whether the data corresponds to a position inside or outside of the polygon (step 34). If the data corresponds to a position outside the polygon (Outside, step 34), the data is discarded (step 39) and another position is read in the scan line (Yes; step 38). If the data corresponds to a position inside the polygon (Inside, step 34), the data is rendered as a low resolution fragment (step 35). The rasterizer unit (102; FIG. 1A) then calculates properties of location, color, and Z-distance (step 36) corresponding to the low resolution fragment using any suitable method. The location data represents the location within the low resolution buffer (113; FIG. 1A) where the low resolution fragment is to be stored. The color and Z-distance data will be described in more detail below.

The newly created fragment is then passed to the texturing unit (103; FIG. 1A) for further processing (step 37). It will be recognized that the fragment may additionally or alternatively be passed to any other processing unit as best serves a particular application.

Returning to step 32, the rasterizer unit (102; FIG. 1A) renders a number of high resolution fragments if the data corresponds to an edge of the polygon (Yes; step 31). In general, the rasterizer unit (102; FIG. 1A) may be configured to render N*M high resolution fragments depending on the resolution chosen. For example, the rasterizer unit (102; FIG. 1A) may be configured to render a group of four high resolution fragments to achieve a two by two sub-pixel resolution.

A position mask is then created for each high resolution fragment (step 33). A position mask, as will be described in more detail below, describes where its corresponding high resolution fragment is to be stored in the high resolution buffer (110; FIG. 1A). The rasterizer unit (102; FIG. 1A) then calculates properties of location, color, and Z-distance (step 36) corresponding to each of the high resolution fragments. The high resolution fragments may then be passed to the texturing unit (103; FIG. 1A) or to any other processing unit for further processing (step 37). The steps of FIG. 2 are repeated until all of the geometric data within the scan line has been processed (No; step 38).

As used herein, the data generated by the rasterizer unit (102; FIG. 1A) will be referred to herein, and in the appended claims, unless otherwise specifically denoted, as "fragments." A fragment contains location information that describes where it is to be stored in the memory buffers (113, 110; FIG. 1A), color information, and Z-distance information. A fragment is promoted to be a "pixel" or a "sub-pixel" when stored in the memory buffers (113, 110; FIG. 1A). A "pixel", as used herein, refers to color and Z-distance information located at a particular position in the low resolution buffer (113; FIG. 1A). A "sub-pixel", as used herein, refers to color and Z-distance information located at a position in the high resolution buffer (110; FIG. 1A).

Figure 3A:
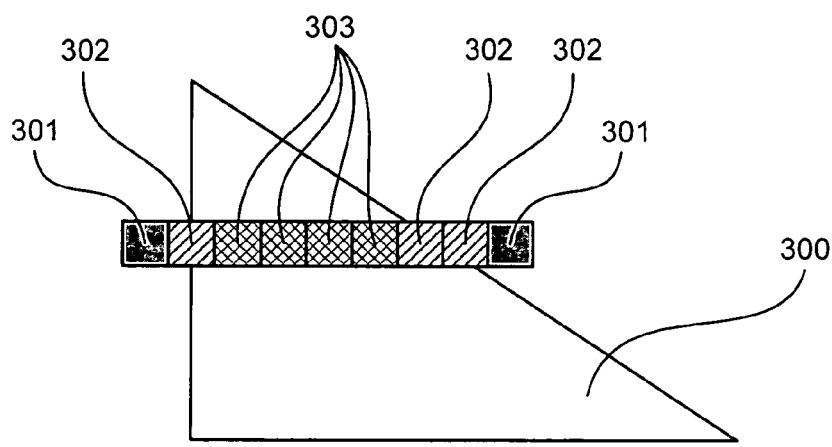
FIG. 3A is a diagram of a polygon being processed by a rasterizer unit into fragments according to principles described herein.

A number of examples of using low and high resolution buffers (113, 110; FIG. 1A), respectively, in the Z-buffer (109; FIG. 1A) to anti-alias edges of a polygon will now be described. FIG. 3A illustrates a representative polygon (300) that may be displayed on the display screen (112; FIG. 1A). The polygon (300) is rendered using a number of fragments, some of which are shown in FIG. 3A. As shown in FIG. 3A, there are three basic types of fragments. First, there are low resolution fragments (301) which are completely outside the polygon (300) and which are typically discarded and not rendered. These fragments (301) are referred to as background fragments (301). Second, there are fragments (303) that are wholly within the polygon (300) that are used to represent the color and texture of the polygon. Finally, there are fragments (302) that contain an edge of the polygon (300). These fragments are called edge fragments (302) because they are only partially covered by the polygon (300) and may require anti-aliasing in order to appropriately render the polygon (300). Edge fragments contain high resolution data where one or more sub-fragments may represent an area outside the polygon. In some examples, the sub-fragments that are entirely outside the polygon are discarded. In some alternatively examples, they are rendered in the background color with the Z-distance considered to be at the maximum.

Figure 3B:
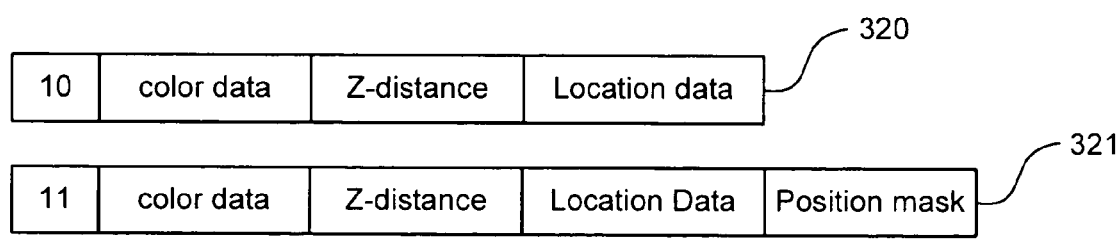
FIG. 3B is a diagram illustrating two exemplary fragment formats according to principles described herein.

FIG. 3B shows two exemplary fragment formats. As mentioned, fragments are used to transport information to the memory buffers (110, 113; FIG. 1A) and thus contain location information indicating where the information is to be stored in the memory buffers (110, 113; FIG. 1A). Hence, as shown in FIG. 3B, a low resolution fragment format (320) includes a bit flag of "10" indicating that it is a low resolution fragment, color data, location data that indicates where the fragment data is to be placed in the low resolution buffer (113; FIG. 1A). The high resolution fragment format (321) includes a bit flag of "11" indicating that it is a high resolution fragment, color data, Z-distance data, location data, and a position mask that describes where the high resolution fragment is to be placed in a cluster of high resolution sub-pixels in the high resolution buffer (110; FIG. 1A).

Figure 3C:
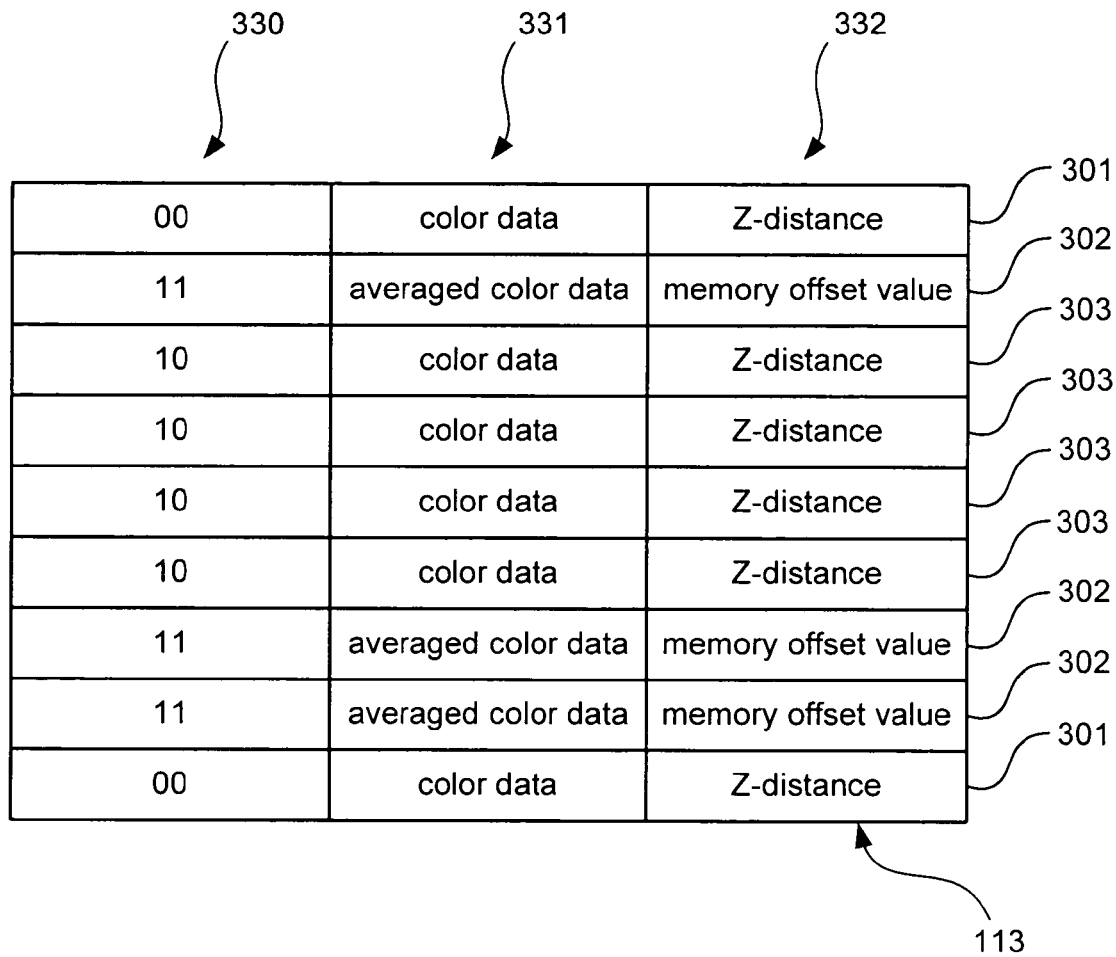
FIG. 3C is a chart illustrating the data fields in a segment of a low resolution portion of a dynamic Z-buffer according to principles described herein.

FIG. 3C is a table representing an exemplary portion of the low resolution buffer (113) of the dynamic Z-buffer (109) that is used to store pixels corresponding to the fragments (301-303). As shown in FIG. 3C, the low resolution buffer (113) may include three data fields that correspond to each pixel location in an image that is being rendered. The first field (330) stores the bit flag(s) associated with particular pixel locations. The second field (331) stores the color data corresponding to the pixel locations. The color data may be a color triplet value, for example. The third field (332) contains the Z-distance data corresponding to the pixel locations. The entries in the table, from top to bottom, correspond to the nine fragments (301-303) illustrated in FIG. 3A, as viewed from left to right. The table representing the low resolution buffer (113) in FIG. 3C is only an example of the possible fields that a memory buffer may contain. The number and type of fields for the low resolution buffer (113) will vary as best serves a particular application.

In some embodiments, as shown in FIG. 3C, the first field (330) contains a two-bit flag that is used to determine whether a fragment is a background fragment (301), a fragment within a polygon (303), or an edge fragment (302). The first bit indicates whether the fragment is part of a polygon or in the image background. The second bit in the two-bit flag is the resolution bit.

In the example of FIG. 3C, if the first bit is a "0", then the corresponding fragment corresponds to a background fragment (301). All background fragments may or may not be the same color. Background fragments are rendered to the display in the appropriate background color if they are not discarded. If the first bit is a "1", then the corresponding fragment is either entirely covered by a polygon in the image or partially covered by a polygon in the image. If the first bit is a "0" then the fragment may be discarded.

Consequently, as illustrated in FIG. 3C, a background pixel (301) is indicated by a "00" in the first position of the bit flag field. The second bit, the resolution bit, is "0" because the background pixel (301) is not an edge pixel. The color data field for this pixel (301) contains the pixel's color data (e.g., a color triplet value). Likewise, the Z-distance field contains the pixel's Z-distance value. Since a background pixel cannot cover any portion of an edge of the polygon, a bit flag value of "01" is not needed since it would be treated the same as a bit flag value of "00."

A pixel (303) that is internal to the polygon (300) is indicated by a "10" in the bit flag field. The second bit, the resolution bit, is "0" because the internal pixel (301) is not covering an edge of the polygon. The color data field for this pixel (303) contains the pixel's color data. Likewise, the Z-distance field contains the pixel's Z-distance value.

In the example of FIG. 3C, an edge pixel (302) is indicated by a bit flag field value of "11." The second bit, the resolution bit, is set to "1" because the pixel (302) is located in a position where it covers an edge of the polygon. As shown in FIG. 3C, the color data field corresponding to an edge pixel (302) contains an averaged color data value. The averaged color data is an average of the color data of a corresponding group of high resolution sub-pixels stored in the high resolution buffer (110; FIG. 1A). This averaging process will be described in more detail below.

As shown in FIG. 3C, in some examples, the Z-distance field for an edge pixel (302) contains a memory offset value that indicates the location of a corresponding group of high resolution sub-pixels that are used to define color of the edge at pixel (302) based on averaging the colors of the sub-pixels in the high resolution buffer (110).

Figure 4A:
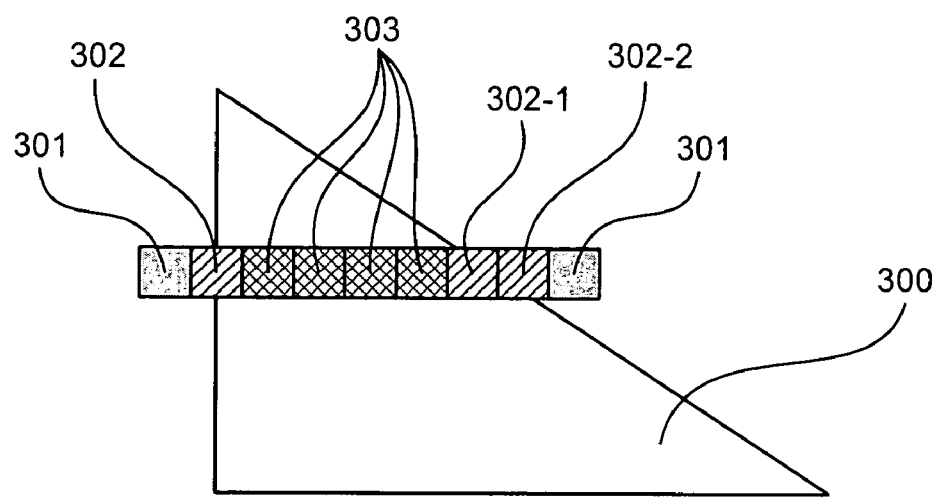
FIG. 4A is a diagram of a polygon being processed by a rasterizer unit into fragments according to principles described herein.

FIG. 4A is substantially identical to FIG. 3A. However, FIG. 4A specifies the location of a particular edge fragment (302-1) on the right-hand edge of the polygon (300). The edge fragment (302-1) will be used to further illustrate how a group of fragments may be used to anti-alias an edge pixel at a two by two and/or a four by four sub-pixel resolution. It will be recognized that the following examples are merely illustrative and that other techniques that allocate space in the high resolution buffer (110) may be used in order to render pixel data at a higher resolution. These other approaches include using sizes other than two by two and four by four arrays of fragments to generate an anti-aliased edge pixel.

Figure 4B:
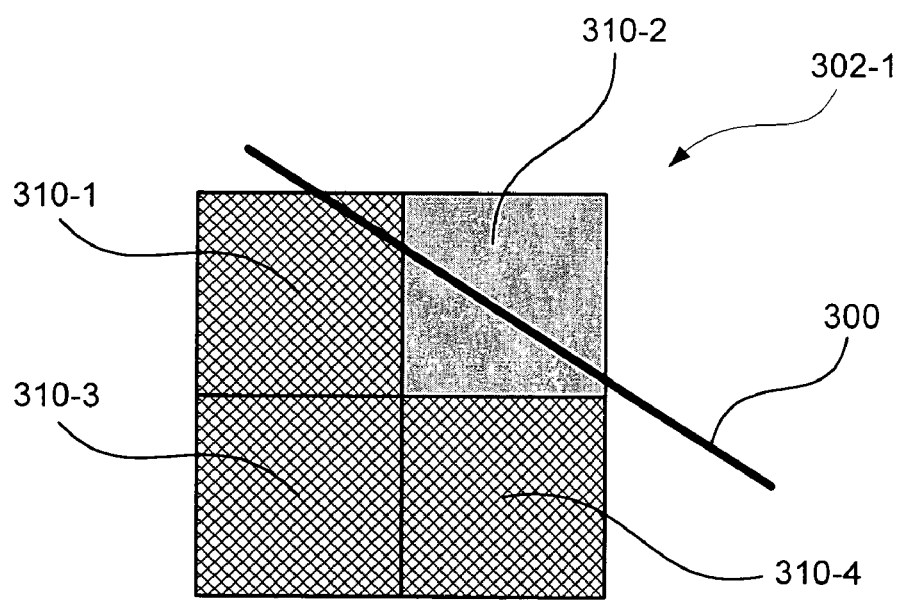
FIG. 4B is a more detailed depiction of an edge fragment shown in FIG. 4A according to principles described herein.

FIG. 4B provides a more detailed illustration of the edge fragment (302-1) shown in FIG. 4A. The edge fragment (302-1) in FIG. 4B is divided into a cluster of four high resolution fragments (310), also referred to herein as sub-fragments, which are arranged in a rectangular, two by two array, or matrix. As shown in FIG. 4B, the edge of the polygon (300) passes mostly through sub-fragment (310-2). Sub-fragments (310-3 and 310-4) are missed entirely by the edge (300), while the other sub-fragment (310-1) is only grazed by the edge of the polygon (300).

For illustrative purposes, a sub-fragment will be treated as an internal, or covered, fragment if the majority of that sub-fragment is within the polygon. A sub-fragment will be treated as a background fragment if the majority of that sub-fragment is outside the polygon. Consequently, sub-fragments (310-1, 310-3, and 310-4) will be treated as fragments internal to the polygon and will be rendered similarly to the fragments (303; FIG. 4) described above. Sub-fragment (310-2) will be considered outside the polygon (300) and will be rendered as a background fragment, similar to the fragments (301) described above. Alternatively, if another polygon is immediately adjacent to the polygon (300) and a majority of the area of sub-fragment (310-2) falls within that second, adjacent polygon, then sub-fragment (310-2) will be rendered as a fragment internal to that second, adjacent polygon when that polygon is rendered. The portions of the high resolution data corresponding to background pixels will be replaced with new fragment data corresponding to the new polygon.

FIG. 5A is a table that illustrates an exemplary organizational structure of a cluster or group of high resolution sub-pixel data in the high resolution buffer (110) corresponding to a cluster or group of high resolution fragments. As shown in FIG. 5A, the organizational structure is similar to the organizational structure of the low resolution buffer (113; FIG. 3C). The organizational structure of FIG. 5A may be used when four high resolution fragments are used to render an image in a corresponding pixel location on the display screen (112; FIG. 1A).

The table of FIG. 5A shows that there are three fields corresponding to each sub-pixel in the high resolution buffer (110). As shown in FIG. 5A, the three fields are a bit flag field, a color data field, and a Z-distance field. The color data fields are used to store color data (e.g., a color triplet value) for each of the corresponding sub-pixels. The Z-distance fields are used to store Z-distance data for each of the corresponding sub-pixels. The bit flag fields are used to indicate whether the color data for corresponding sub-pixels should be used in the averaging process that generates the color data defining the edge pixel (302-1) in the low resolution buffer (113; FIG. 1A). For example, when the bit flag is set to "1" for a particular sub-pixel, the color data for that sub-pixel is used in the averaging process that generates an averaged color triplet value for a corresponding edge pixel (302-1). However, if the bit flag is set to "0," the color data of the corresponding sub-pixel is not used in the averaging process. Rather, the background color value is used as the color for that sub-pixel in the averaging process that generates the averaged color triplet value.

FIG. 5B illustrates the data fields and structure of the high resolution buffer (110) for two of the fragments (302-1 and 302-2) of FIG. 4A. The high resolution buffer (110) may be arranged as a linear array of sub-pixel clusters. Because this example corresponds to a two by two sub-pixel array, each sub-pixel cluster holds four color data values, four Z-distance values, and four sets of bit flags.

The first entry in FIG. 5B corresponds to the fragment that represents the sub-pixel (310-1). As shown in FIG. 5B, the bit flag value for this sub-pixel is "1." Thus, the color data for this fragment color data is used to in the averaging process that generates the color data for the edge pixel (302-1). The second entry in the table corresponds to the fragment that represents the sub-pixel (310-2). In this case, the bit flag is set to "0." Thus, the color data for this fragment is not used in the averaging process that generates the color data for the edge pixel (310-2). Rather, the background color is used for this fragment in the averaging process that generates the color data for the edge pixel (302-1). The entries corresponding to sub-pixels (310-3 and 310-4) are also shown in FIG. 5B.

In some examples, the display controller (115) averages the color data of the sub-pixels (referred to here as sub-pixels and not as high resolution fragments because they exist within the Z buffer (109; FIG. 1A)) and writes the resulting averaged color data in the low resolution buffer (113). Thus, in this example, the display controller (115) averages the color data for sub-pixels (310-1, 310-3, and 310-4) and the background color for sub-pixel (310-2). The display controller (115) then writes the averaged color data in the color data field (331) corresponding to the edge pixel (302-1) of the low resolution buffer (113).

Figure 6A:
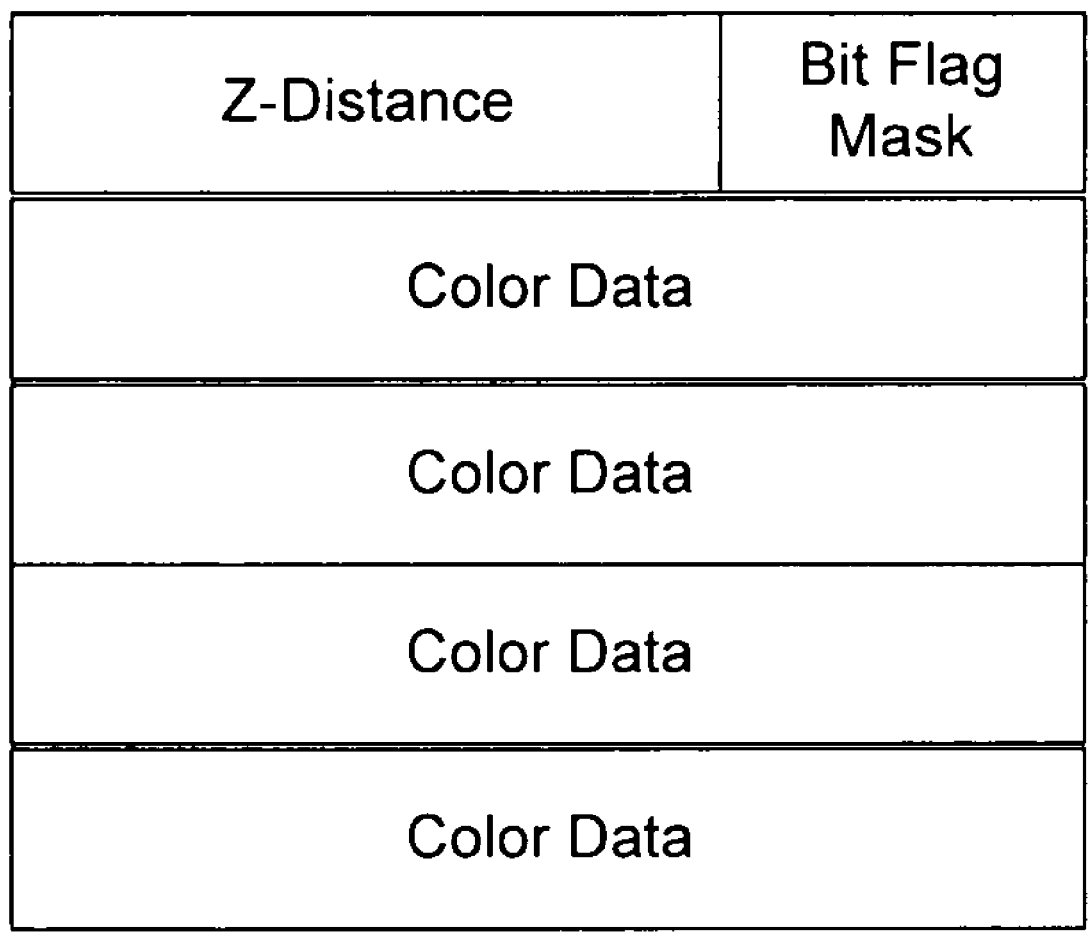
FIG. 6A is a table that illustrates an additional exemplary organizational structure of a cluster of sub-pixel data in the high resolution buffer according to principles described herein.

FIG. 6A is a table that illustrates another exemplary organizational structure of a cluster of sub-pixels in the high resolution buffer (110). Each cluster of sub-pixels corresponds to a pixel that represents an edge of the polygon. The organizational structure of FIG. 6A may be used in applications that only provide one Z-distance value for the entire cluster of sub-pixels instead of individual Z-distance values for each of the sub-pixels.

Figure 6B:
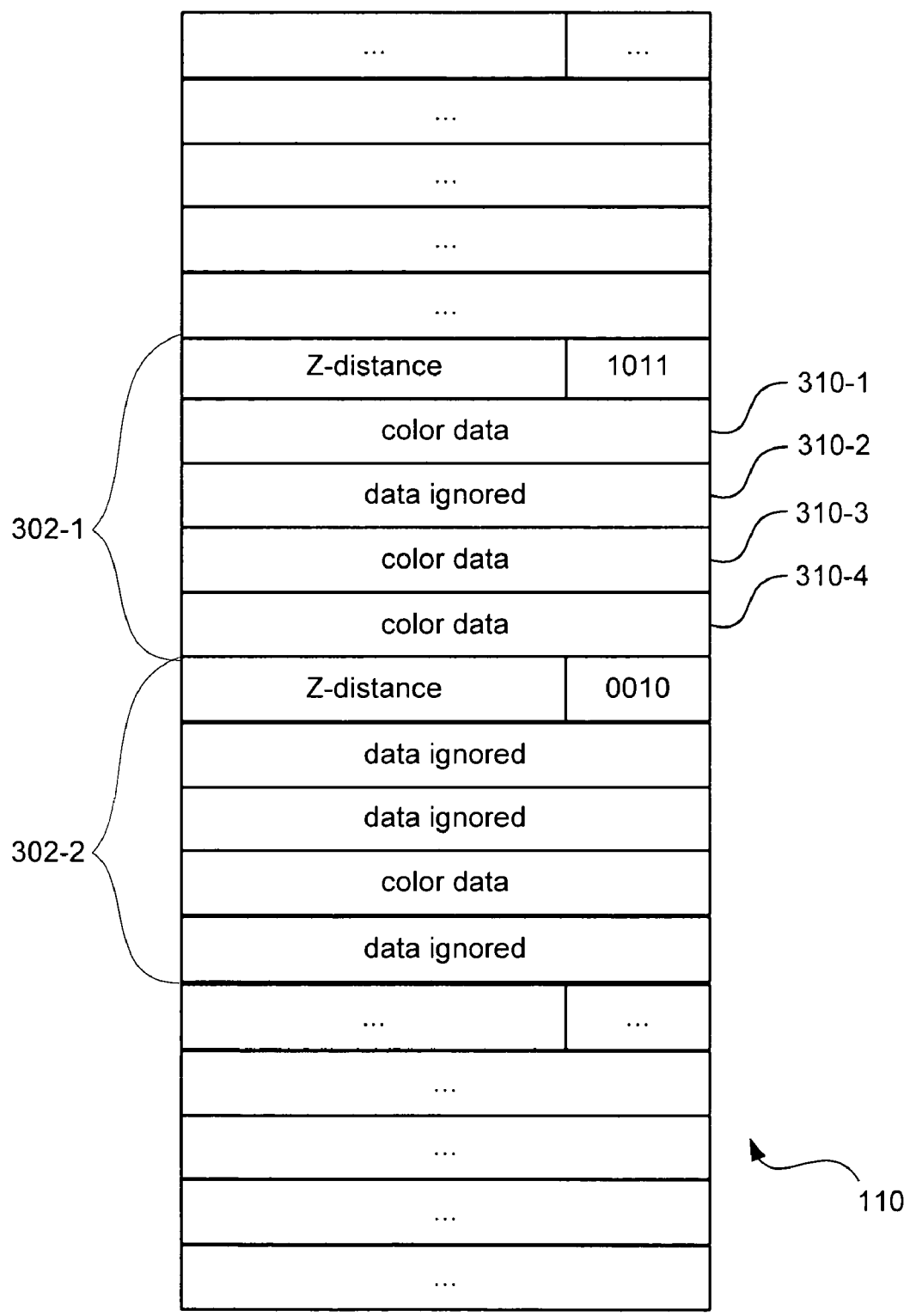
FIG. 6B illustrates the data fields and structure of the high resolution buffer for two of the fragments of FIG. 4A according to principles described herein.

The organizational structure of FIG. 6A is used to generate a pixel with two by two sub-pixel resolution. As shown in FIG. 6, the buffer includes one Z-distance field and one bit flag mask field that correspond to a cluster of sub-pixels. A color data field may also be included for each of the sub-pixels in the cluster of sub-pixels. The bit flag mask includes a bit that represents each sub-pixel. Each bit indicates whether its corresponding sub-pixel is used in the averaging process that is used to generate the color data for the edge pixel (e.g., 302-1; FIG. 4A). An example of the organizational structure of FIG. 6A is given below in connection with FIG. 6B.

FIG. 6B illustrates the data fields and structure of the high resolution buffer (110) for two of the fragments (302-1 and 302-2) of FIG. 4A. The example of FIG. 6B uses the organizational structure of FIG. 6A. As shown in FIG. 6B, the Z-distance value for the edge pixel (302-1) is stored in the first field. The bit flag mask field for the edge pixel (302-1) is "1011". A "1" indicates that the color data delivered from an incoming fragment is used in the averaging process that generates the averaged color data for the edge pixel (302-1). A "0" indicates that the color data of the background is used as the color of the sub-pixel in the averaging process.

Figure 7:
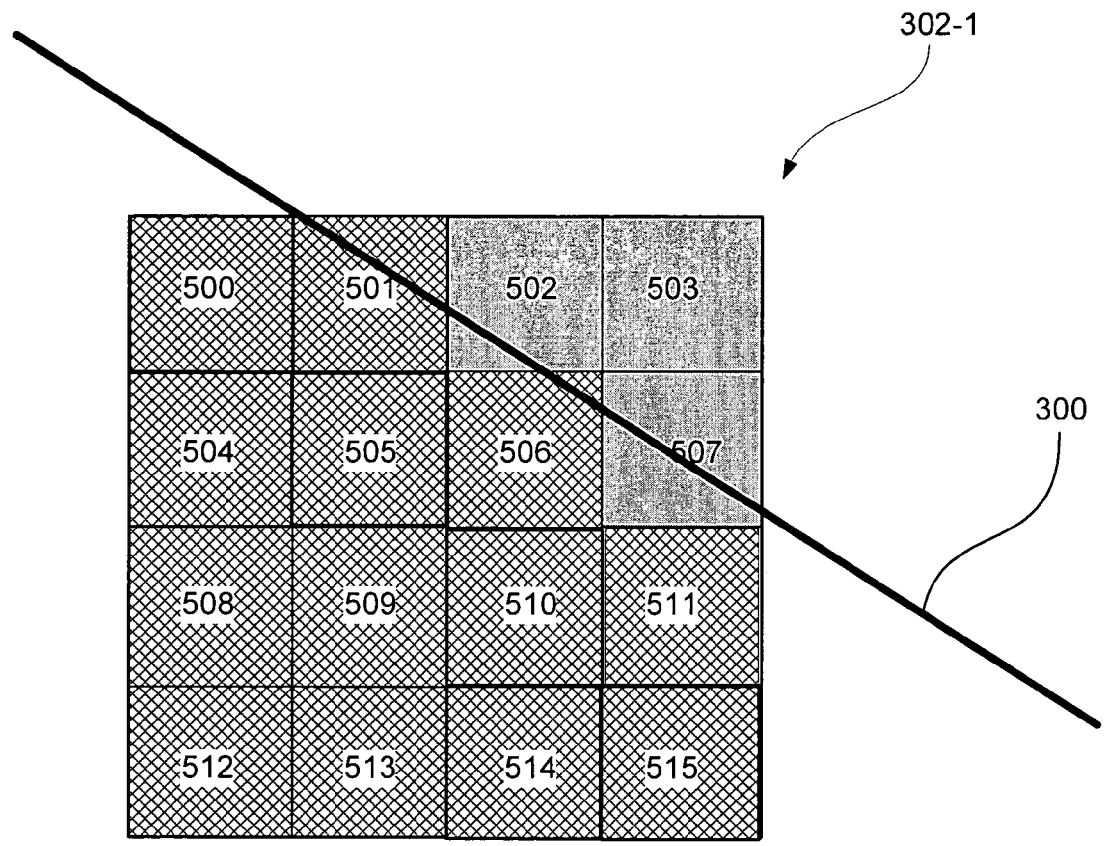
FIG. 7 is a diagram of a fragment divided into sixteen high resolution sub-fragments according to principles described herein.

FIG. 7 and FIG. 8 illustrate another exemplary embodiment that uses a four by four array of sub-pixels to generate an anti-aliased edge pixel. FIG. 7 provides a more detailed illustration of the edge fragment (302-1) shown in FIG. 4A. As shown in FIG. 7, the edge fragment (302-1) is divided into 16 sub-fragments (500-515) which are arranged in a rectangular, four by four array, or matrix. The color data of sub-pixels corresponding to the 16 sub-fragments (500-515) is averaged to produce the color data defining the corresponding edge pixel (302-1) in the rendered image.

As shown in FIG. 7, the edge of the polygon (300) passes mostly through sub-fragments (502 and 507). Sub-fragment (502) is entirely outside the polygon (300). Sub-fragments (500, 504505, and 508-515) are missed entirely by the edge of the polygon (300), while the other sub-fragments (501 and 506) are only grazed by the edge of the polygon (300).

Like the example of FIG. 4B, a sub-fragment in FIG. 7 will be treated as an internal, or covered, fragment if the majority of that sub-fragment is within the polygon. A sub-fragment will be treated as a background fragment if the majority of that sub-fragment is outside the polygon. Consequently, sub-fragments (500, 501, 504-506, and 508-515) will be treated as fragments internal to the polygon and will be rendered similarly to the fragments (303) described above. Sub-fragments (502, 503, and 507) will be considered outside the polygon (300) and will be rendered as a background fragment, similar to the fragments (301) described above. Alternatively, if another polygon is immediately adjacent to the polygon (300) and a majority of the area of sub-fragment (310-2) falls within that second, adjacent polygon, then sub-fragments (502, 503, and 507) will be rendered as a fragment internal to that second, adjacent polygon.

FIG. 8 illustrates the data fields and structure of the high resolution buffer (110) for the configuration of FIG. 7. As mentioned previously, the elements stored within the high resolution buffer (110) are referred to as sub-pixels. The example of FIG. 8 uses the exemplary organizational structure explained in connection with FIG. 5A. The high resolution buffer (110) may be arranged as a simple linear array of sub-pixel clusters. Because this example corresponds to a four by four sub-pixel array, each sub-pixel cluster includes sixteen sub-pixels.

The first entry in the table of FIG. 8 corresponds to the sub-pixel (500). As shown in FIG. 8, the bit flag value for this sub-pixel is "1." Thus, the sub-pixel's color data is used in the averaging process that generates the color data of the low resolution pixel in the low resolution buffer (113; FIG. 1A). Data fields corresponding to the sub-pixels (501-515) are also shown in FIG. 8.

FIG. 9A is a table that illustrates another exemplary organizational structure of a cluster of sub-pixels in the high resolution buffer (110). Each cluster of sub-pixels corresponds to one low resolution pixel in the low resolution buffer (113; FIG. 1A). The organizational structure of FIG. 9A may be used in applications that only provide one Z-distance value for the entire cluster of sub-pixels instead of individual Z-distance values for each of the sub-pixels. The organizational structure of FIG. 9A is similar to that described in connection with FIG. 6A.

Figure 9B:
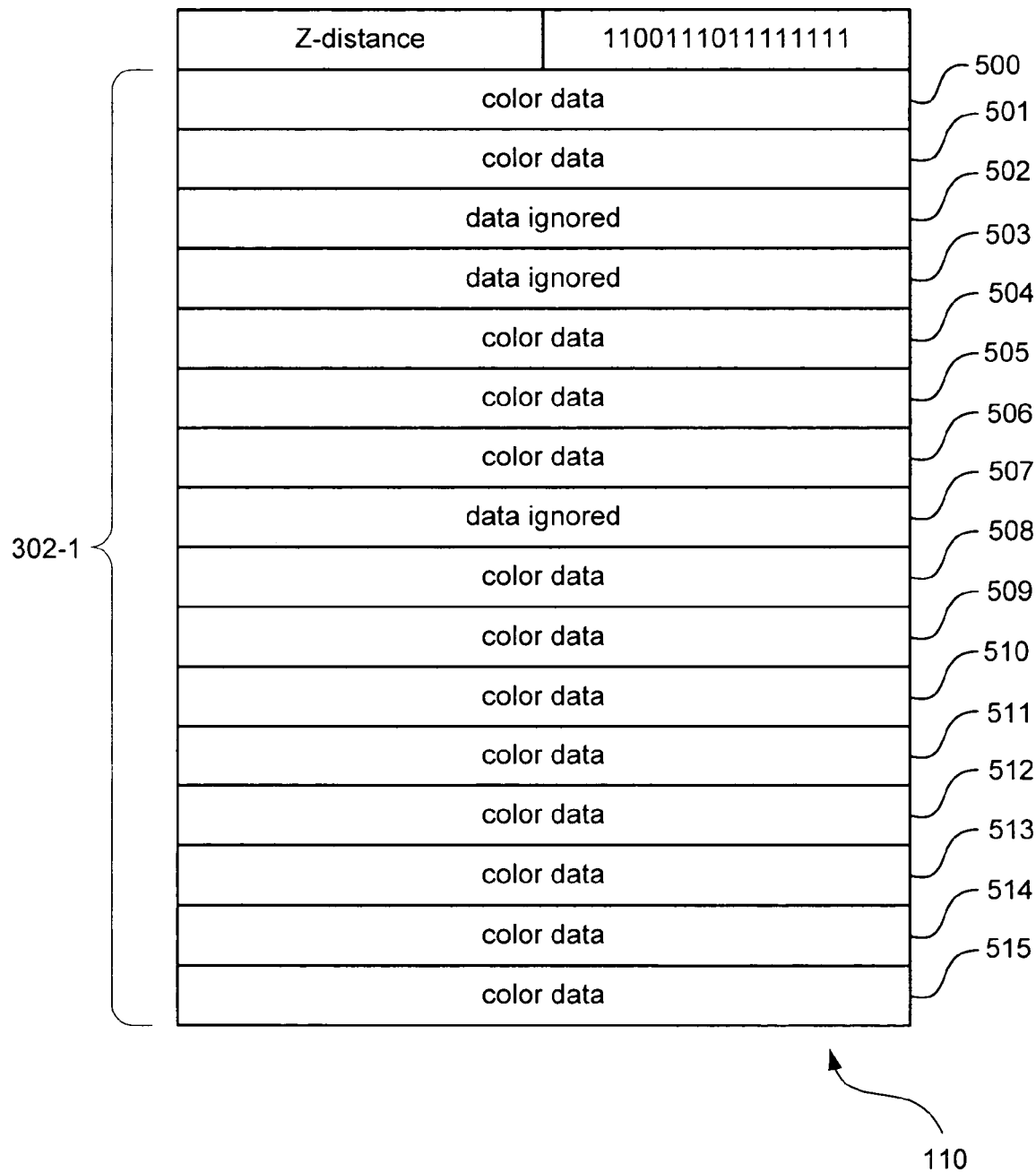
FIG. 9B illustrates the data fields and structure of the high resolution buffer for an edge fragment of FIG. 7 according to principles described herein.

FIG. 9B illustrates the data fields and structure of the high resolution buffer (110) for the edge pixel (302-1) of FIG. 7. The example of FIG. 9B uses the organizational structure of FIG. 9A. As shown in FIG. 9B, the Z-distance value for the edge pixel (302-1) is stored in the first field. The bit flag mask field for the edge pixel (302-1) is "1100111011111111". A "1" indicates that the color data of its corresponding sub-pixel is used in the averaging process that generates the averaged color data for the edge pixel (302-1). A "0" indicates that the color data of its corresponding sub-pixel is not used in the averaging process. Rather, the background color is used as the color of the sub-pixel in the averaging process. The averaging process may be the same as described above in connection with FIG. 5B.

Returning to FIG. 1A, the display controller (115) continuously scans the contents of the low resolution buffer (113) and outputs the data in the color data fields to the video signal generator (111) or some other display circuitry. This scanning process may alternatively be performed periodically at a rate that may be specified as best serves a particular application. For an edge pixel where higher resolution and, therefore, more fragment data, is delivered from the rasterizer unit (102; FIG. 1A), the display controller (115) dynamically allocates more memory space in the high resolution buffer (110) to store that data. The final averaged color that is assigned to edge pixels in the low resolution buffer (113) produces the anti-aliasing effect. Consequently, anti-aliasing is accomplished without expensive components or video artifacts.

Figure 1B:
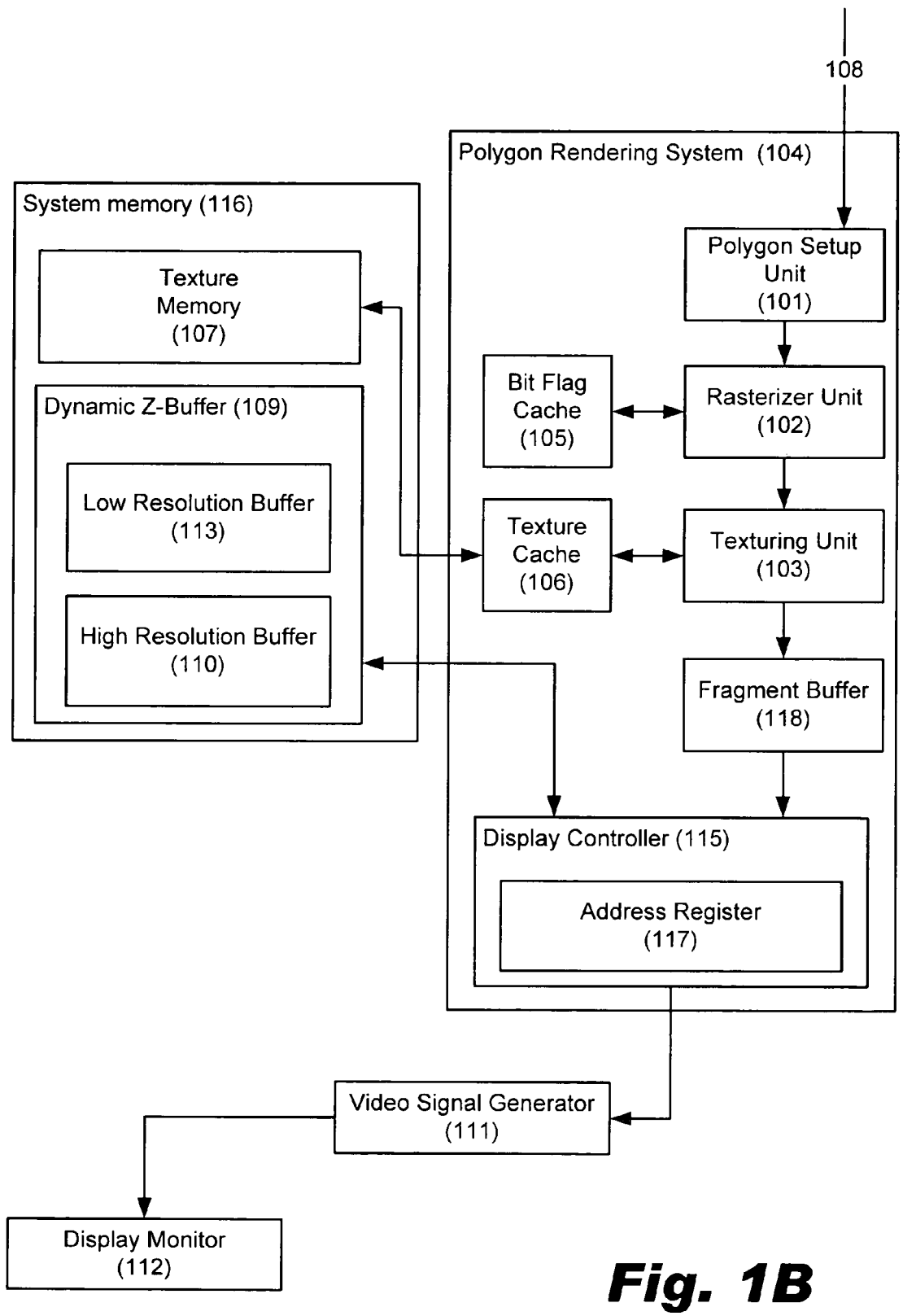
FIG. 1B is a block diagram illustrating another exemplary polygon rendering system according to principles described herein.

When the display controller (115) allocates memory for the high resolution buffer (110), the starting address of the high resolution buffer (110) is stored in an address buffer (114). The display controller (115) may then refer to the address buffer (114) when it accesses the high resolution buffer (110). The address buffer (114) may be located in the Z-buffer itself (109), as shown in FIG. 1A. FIG. 1B shows an alternate embodiment where the address is stored in a register (117) in the display controller (115). However, the starting address of the high resolution buffer (110) may be stored in any other location as best serves a particular application.

After an image has been rendered, the high resolution buffer (110) may be cleared by the display controller (115). More specifically, the polygon rendering system (104) may transmit a reset command to the display controller (115). The display controller (15) may then reset all the bits in the high resolution buffer (10) to "0." The display controller (115) may also reset the value stored in the address buffer (114).

Figure 10A:
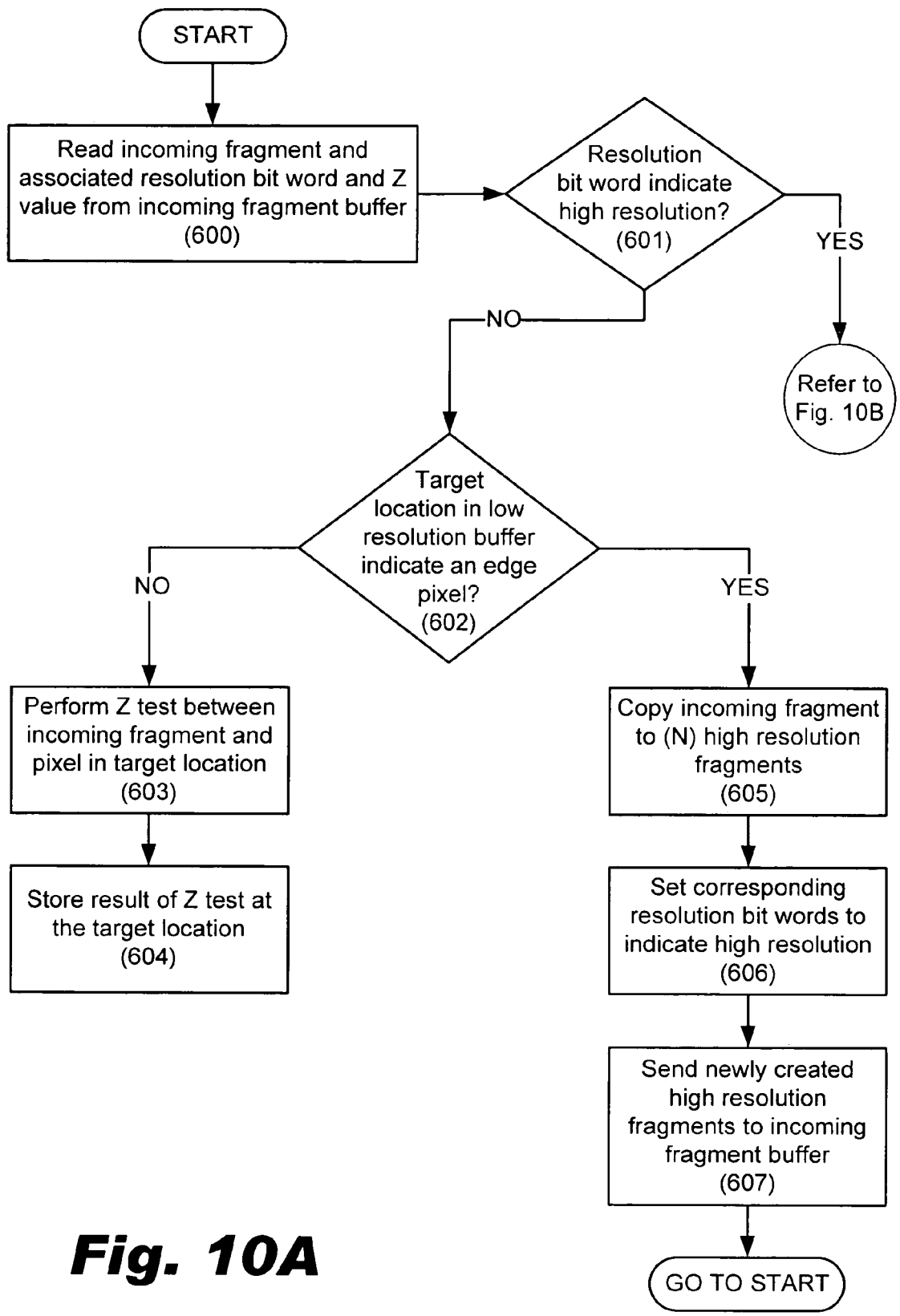
FIGS. 10A-10B are flow charts illustrating an exemplary method of rendering a number of pixels in an image to be displayed according to principles described herein.
Figure 10B:
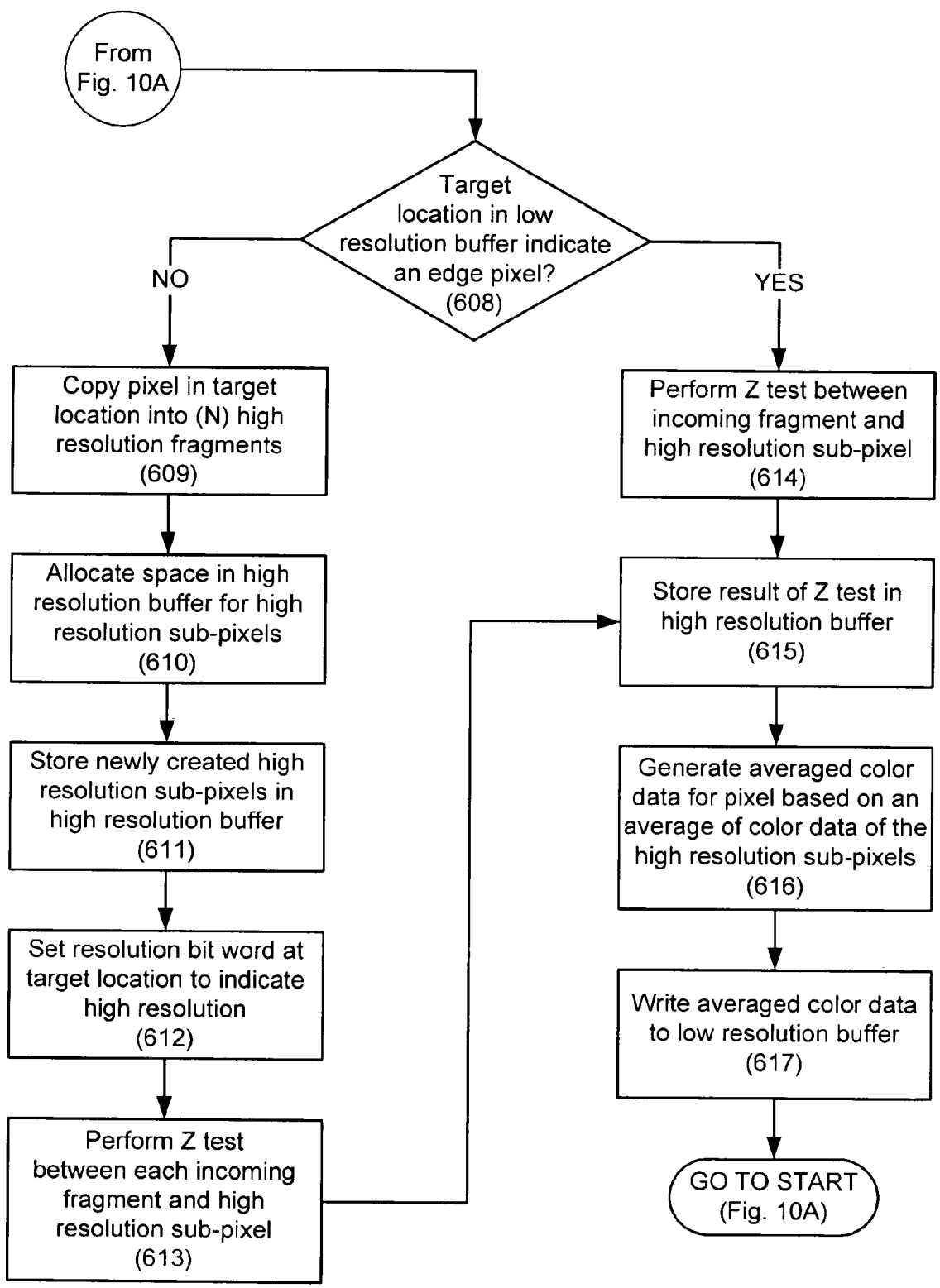

The anti-aliasing system of FIG. 1A and/or FIG. 1B may be controlled, initiated, implemented, or programmed by a processor or the like via a set of computer readable instructions. These computer readable instructions may be constructed in any programming language, such as C, for example, and stored on any medium capable of storing computer readable instructions such as a compact disk (CD), digital video disk (DVD), floppy disk, or hard drive, for example. FIGS. 10A-10B are flow charts illustrating an exemplary method of rendering a number of pixels in an image to be displayed. The steps shown in FIGS. 10A-10B may performed by a processor or the like via a set of computer readable instructions. The steps described in FIGS. 10A-10B are exemplary and may be modified as best serves a particular application. Furthermore, the steps described in connection with FIGS. 10A-10B may be processed in any order.

The anti-aliasing system of FIG. 1A and/or FIG. 1B may additionally or alternatively be controlled, initiated, implemented, or programmed as an ASIC, FPGA, or any other combination of hardware and/or software. In some examples, a high level programming language, such as Verilog or VHDL, may be used to define the operations to be performed. This ASIC or FPGA would encompass all of the operations ascribed to the display controller (15).

As shown in FIG. 10A, a processor reads the incoming fragment that has been generated by the rasterizer unit (102; FIG. 1A) including its associated resolution bit word and Z value from the incoming fragment buffer (118; FIG. 1A) (step 600). The processor may be included within the display controller (115; FIG. 1A) or any other suitable processing unit, ASIC, or FPGA. If the resolution bit word indicates that the fragment is not a high resolution fragment (No; step 601), the processor may then compare the incoming fragment with pixel data that may already be stored in the incoming fragment's corresponding target location in the low resolution buffer (113; FIG. 1A) or in the high resolution buffer (110; FIG. 1A). If pixel data is already stored in the target location of the low resolution buffer (113; FIG. 1A) and if the pixel data is associated with a non-edge pixel (No; step 602), the processor performs a Z test between the incoming fragment and the pixel already stored in the target location (step 603). The result of the Z test is then stored in the target location (step 604).

The Z test compares the Z distances of the incoming fragment and the pixel data already stored in the target location. If an incoming low resolution fragment has a Z distance that is greater than the current low resolution pixel in the target location, the incoming fragment is discarded or ignored. If the incoming low resolution fragment has a smaller Z-distance, the incoming low resolution fragment replaces the current low resolution pixel in the target location in the low resolution buffer (113; FIG. 1A). Once stored in the low resolution buffer (113; FIG. 1A), the low resolution fragment is referred to as a low resolution pixel.

However, if the target location indicates that high resolution sub-pixels corresponding to an edge pixel are already stored in the high resolution buffer (110; FIG. 1A) (Yes; step 602), the incoming low resolution fragment is copied into the same number of high resolution fragments (step 605). For example, if four high resolution fragments corresponding to an edge pixel are already stored in the high resolution buffer (110; FIG. 1A), the incoming fragment is copied into four high resolution fragments. This step may be performed by the processor, display controller (115; FIG. 1A), or by any other processing unit, such as a fragment splitter. Corresponding resolution bit words are set to indicate that the fragments now have the higher resolution (step 606). The newly created high resolution fragments are then sent back to the incoming fragment buffer (118; FIG. 1A) (step 607) so that they can be processed and compared to the corresponding high resolution sub-pixels that are already stored in the high resolution buffer (110; FIG. 1A). In some alternative examples, the newly created high resolution fragments are processed and written immediately to the high resolution buffer (110; FIG. 1A) as sub-pixels without being sent to the incoming fragment buffer (118; FIG. 1A).

Returning to step 601, if the resolution bit word of the incoming fragment indicates that the incoming fragment is a high resolution fragment (Yes; step 601), the incoming fragment may then be processed as shown in FIG. 10B. First, the processor determines whether non-background data is already stored in either the low resolution buffer (113; FIG. 1A) or the high resolution buffer (110; FIG. 1A). If the target location in the low resolution buffer (113; FIG. 1A) indicates that high resolution sub-pixels are already stored in the high resolution buffer (110; FIG. 1A) in a location corresponding to the target location (Yes; step 608), the processor performs a Z test between the incoming fragment and its corresponding high resolution sub-pixel in the high resolution buffer (110; FIG. 1A) (step 614). The result of the Z test is stored in the high resolution buffer (step 615) as a sub-pixel.

The Z test compares the Z distances of the incoming fragment and the corresponding high resolution sub-pixel already stored in the high resolution buffer (110; FIG. 1A). If the incoming fragment has a Z distance that is greater than the corresponding high resolution sub-pixel in the high resolution buffer (110; FIG. 1A), the incoming fragment is discarded or ignored. However, if the incoming fragment has a smaller Z-distance, the incoming fragment replaces the corresponding high resolution sub-pixel in the high resolution buffer (110; FIG. 1A) as a new sub-pixel.

The processor or display controller (115; FIG. 1A) may then generate new color data for the corresponding low-resolution pixel in the low resolution buffer (113; FIG. 1A) based on an average of the color data of the high resolution sub-pixels stored in the high resolution buffer (110; FIG. 1A) (step 616). The new averaged color data, which produces the anti-aliased effect, is then written to the low resolution buffer (step 617), as described previously.

Returning to step 608, if the target location in the low resolution buffer (113; FIG. 1A) indicates that a fragment associated with a non-edge pixel is currently stored in the low resolution buffer (110; FIG. 1A) (No; step 608), the low resolution pixel in the target location is copied into a number of high resolution sub-pixels (step 609). For example, if the incoming fragment is one of four high resolution fragments corresponding to an edge pixel, the pixel that is already stored in the target location of the low resolution buffer (113; FIG. 1A) is copied into four high resolution sub-pixels. This step may be performed by the processor, display controller (113; FIG. 1A), or by any other processing unit, such as a fragment splitter. The processor then allocates space in the high resolution buffer (step 610) and stores the newly created high resolution sub-pixels therein (step 611). The resolution bit word at the target location in the low resolution buffer (110; FIG. 1A) may also be set to indicate that high resolution sub-pixels are now stored in the high resolution buffer (step 163).

A Z test may then be performed between the incoming high-resolution fragment and a corresponding high resolution sub-pixel in the high resolution buffer (110; FIG. 1A) (step 613). The result of the Z test is stored in the high resolution buffer (110; FIG. 1A) (step 615). As described previously, the processor may then generate new color data for the corresponding pixel in the low resolution buffer (113; FIG. 1A) based on an average of the color data of the high resolution sub-pixels stored in the high resolution buffer (110; FIG. 1A) (step 616). The new averaged color data is then written to the low resolution buffer (step 617).

In some examples, some edge pixels may be sufficiently anti-aliased when rendered at a different resolution than other edge pixels. For example, as will be recognized by those skilled in the art, edge pixels located along an edge line of a polygon that has a slope near 45 degrees may be sufficiently anti-aliased when rendered at a lower resolution than edge pixels located along an edge that is more horizontal or vertical.

Figure 11:
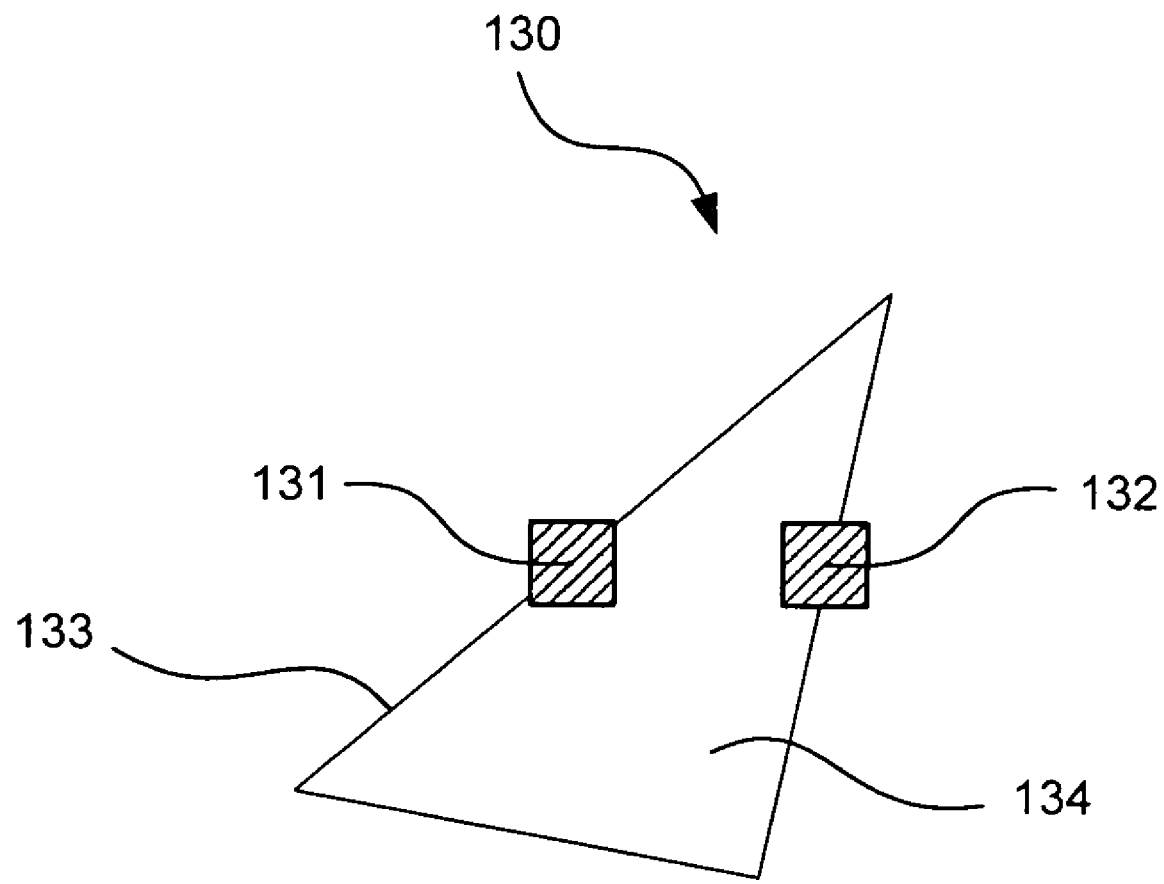
FIG. 11 illustrates a representative polygon with edge fragments that may be rendered at different resolutions while still achieving sufficient anti-aliasing according to principles described herein.

FIG. 11 illustrates a representative polygon (130) with edge fragments (131, 132) that may be rendered at different resolutions while still achieving sufficient anti-aliasing. As shown in FIG. 11, a first edge fragment (131) is located along a first edge (133) of the polygon (130) and a second edge fragment (132) is located along a second edge (134) of the polygon (130). The first edge (133) has a slope that is substantially equal to 45 degrees and the second edge (134) has a slope that is close to vertical. Hence, as will be recognized by those skilled in the art, the first edge fragment (131) may be sufficiently anti-aliased at a lower resolution than the second edge fragment (132). For example, the first edge fragment (131) may be rendered at a medium resolution (e.g., represented by a two by two sub-fragment array) and the second edge fragment (132) may be rendered at a high resolution (e.g., represented by a four by four sub-fragment array).

Hence, the anti-aliasing system of FIG. 1A and/or FIG. 1B may be configured to selectively render an edge fragment in an image at any number of resolutions. For example, some edge fragments (e.g., edge fragment (131)) in an image may be rendered at a first high resolution (e.g., represented by a two by two sub-pixel array in the high resolution buffer (110; FIG. 1A)) and other edge fragments (e.g., edge fragment (132)) in the image may be rendered at a second high resolution (e.g., represented by a four by four sub-pixel array in the high resolution buffer (110; FIG. 1A)). It will be recognized that the anti-aliasing system may be configured to render each edge fragment at any resolution as best serves a particular application. However, for illustrative purposes only, it will be assumed in the following examples that the anti-aliasing system is configured to render an edge fragment at either a first high resolution or at a second high resolution. The terms "first high resolution" and "second high resolution" will be used herein and in the appended claims, unless otherwise specifically denoted, to refer to two possible resolutions at which an edge fragment may be rendered. Unless otherwise specifically denoted, an edge fragment rendered at the first high resolution has a resolution that is lower than an edge fragment rendered at the second high resolution. An exemplary first high resolution is represented by a two by two sub-pixel array and an exemplary second high resolution is represented by a four by four sub-pixel array.

Figure 12:
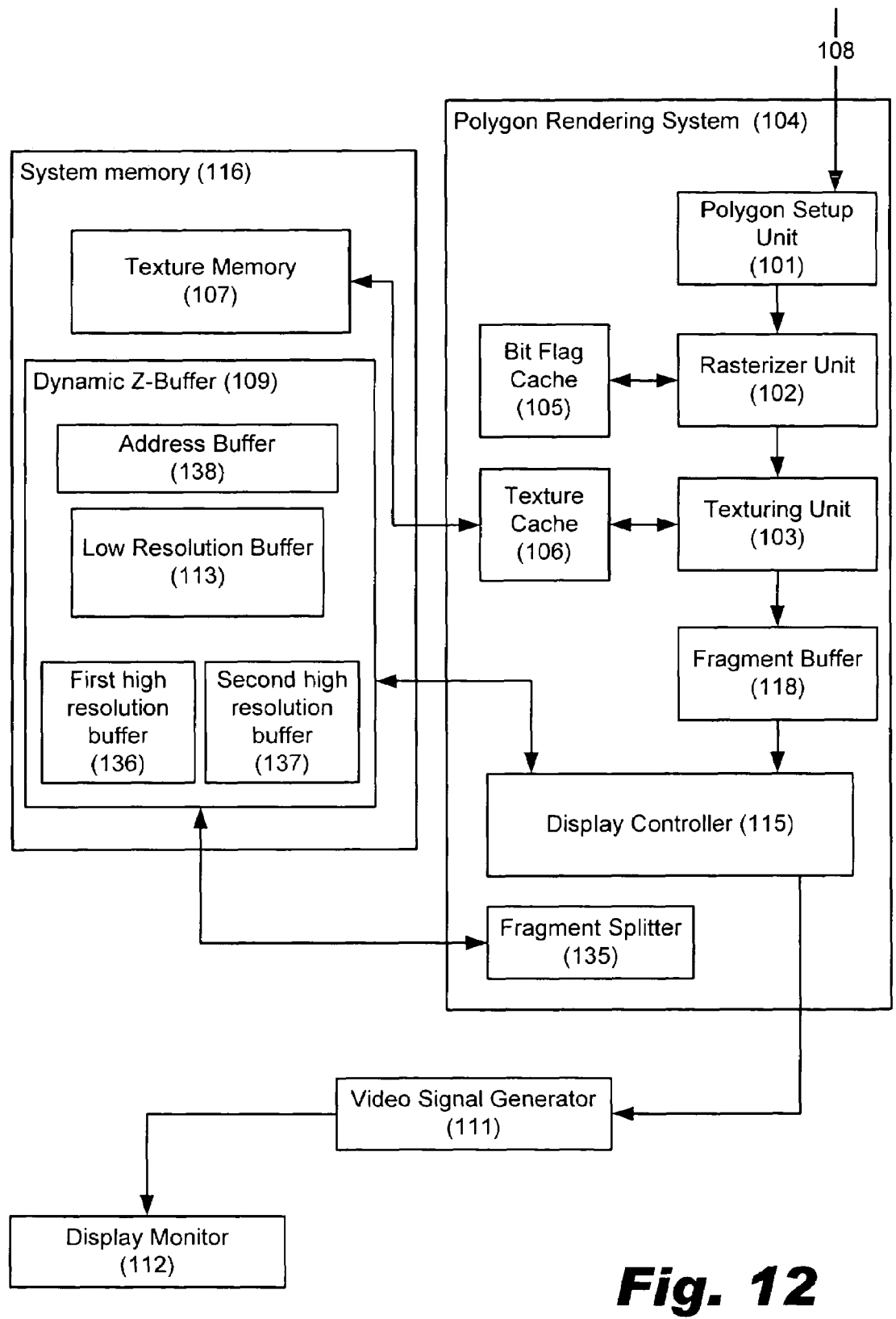
FIG. 12 illustrates an exemplary polygon rendering system that may be configured to selectively render each edge fragment in an image at any of a number of different resolutions according to principles described herein.

FIG. 12 illustrates an exemplary anti-aliasing system that may be configured to selectively render each edge fragment in an image at any of a number of different resolutions. The anti-aliasing system is substantially similar to the systems shown in FIGS. 1A-1B. However, the polygon rendering system (104) in FIG. 12 includes additional buffers (136, 137) in the dynamic Z-buffer (109) and a fragment splitter unit (135), all of which will be described in more detail below.

As described in connection with FIG. 1A, the rasterizer unit (102) of FIG. 12 determines whether incoming geometric data corresponding to a particular pixel location defines an edge of the polygon being rendered. In some embodiments, the rasterizer unit (102) is also configured to determine the slope of the edge of the polygon. If the slope of the edge is within a predetermined range, the rasterizer unit (102) generates and outputs a number of high resolution fragments that are used to render an edge at the first high resolution. However, if the slope of the edge is not within the pre-determined range, the rasterizer unit (102) generates and outputs a number of high resolution fragments that are used to render the edge pixel at the second high resolution.

The pre-determined range may vary and be adjusted as best serves a particular application. For example, the rasterizer unit (102) may be configured to render the edge pixel at the first high resolution if the edge has a slope in the range of 30 to 60 degrees. It will be recognized that the range may be narrower (e.g., between 40 and 50 degrees) or broader (e.g., between 20 and 70 degrees) as best serves a particular application. In some examples, the range may be defined by a user.

As described in connection with FIG. 1A, the rasterizer unit (102) of FIG. 12 communicates with a bit flag cache (105) that holds a resolution bit word corresponding to each pixel location on the screen of the display monitor (112). As previously described, each resolution bit word may be of an appropriate length so as to represent every possible resolution at which the pixels are rendered. For example, if a pixel may be rendered at a low resolution, at a first high resolution, or at a second high resolution, the resolution bit word may be expanded to include multiple bits. In some examples, the resolution bit word "100" represents a low resolution, "110" represents the first high resolution, and "111" represents the second high resolution. However, it will be recognized that different resolution bit words may be used to represent each of the possible resolutions.

Before each polygon is rendered, each of the resolution bit words in the bit flag cache (105) is initialized to contain a "000" value. When the rasterizer unit (102) identifies geometric data corresponding to an edge pixel that is to be rendered at the first high resolution, it writes a "110" to the location in the bit flag cache (105) corresponding to that edge pixel. When the rasterizer unit (102) identifies geometric data corresponding to an edge pixel that is to be rendered at the second high resolution, it writes a "111" to the location in the bit flag cache (105) corresponding to that edge pixel.

After the low resolution fragment or group of high resolution fragments corresponding to a particular pixel location is generated by the rasterizer unit (102), it is stored in the dynamic Z-buffer (109) as pixel data. The resolution bit word corresponding to the pixel location is also stored in the Z buffer (109). In some examples, as shown in FIG. 12, the Z-buffer (109) may include a number of dynamic buffers (136, 137) in which high resolution fragments are stored. The number of additional high resolution buffers may vary as best serves a particular application. For example, as shown in FIG. 12, the Z-buffer (109) may include a first high resolution buffer (136) and a second high resolution buffer (137). For illustrative purposes only, it will be assumed that the Z-buffer (109) includes two high resolution buffers (136, 137) in the following examples. The high resolution buffers (136, 137) may be designated portions of the Z-buffer (109) structure, as shown in FIG. 12, or they may be separate memory buffers. In some alternative examples, the first and second high resolution buffers (136, 137) are integrated into a single high resolution buffer. In these examples, bit flags may be used to determine which locations within the single high resolution buffer correspond to fragments having the first high resolution and which locations within the single high resolution buffer correspond to fragments having the second high resolution.

Each the high resolution buffers (136, 137) may be structured like the high resolution buffer (110) illustrated and described in connection with FIGS. 5A, 5B, 6A, 6B, 8, 9A, and/or 9B. For example, the first high resolution buffer (136) may be configured to store groups of high resolution fragments as corresponding groups of four sub-pixels, as illustrated and described in connection with FIGS. 5A, 5B, 6A, and 6B. The second high resolution buffer may be configured to store groups of high resolution fragments as corresponding groups of sixteen sub-pixels, as illustrated and described in connection with FIGS. 8, 9A, and 9B.

Returning to FIG. 12, when a low resolution fragment or group of high resolution fragments, including a corresponding resolution bit word, are communicated to the Z-buffer (109), the display controller (115) detects the value of the resolution bit word. If the resolution bit word is set to "000," the display controller (115) stores the low resolution fragment as a low resolution pixel in a location associated with the particular pixel location in the low resolution buffer (113). However, if the resolution bit word is set to a value (e.g., "110") indicating that a group of high resolution fragments has been generated by the rasterizer unit (102) at the first high resolution, the display controller (115) allocates additional memory in the first high resolution buffer (136) and stores the group of high resolution fragments as sub-pixels therein. Likewise, if the resolution bit word is set to a value (e.g., "111") indicating that a group of high resolution fragments has been generated by the rasterizer unit (102) at the second high resolution, the display controller (115) allocates additional memory in the second high resolution buffer (137) and stores the group of high resolution fragments as sub-pixels therein.

When the display controller (115) allocates additional memory for the first and/or second high resolution buffers (136, 137), the starting address of the first and/or second high resolution buffers (136, 137) may be stored in an address buffer (138). The display controller (115) may subsequently refer to the address buffer (138) when it accesses the first and/or second high resolution buffers (136, 137). An exemplary location for this address buffer (138) is in the Z-buffer itself (109), as shown in FIG. 12. The address buffer (138) may alternatively be located in the display controller (115) or in any other location as best serves a particular application.

If a fragment's resolution bit word indicates that the fragment defines an edge pixel (i.e., the value of the resolution bit word is "110" or "111"), then the portion of the low resolution buffer (113) that is normally used to hold the Z-distance value for that fragment is instead used to store a memory offset value. The memory offset value gives the location in either the first or second memory buffers (136, 137) of the edge pixel's corresponding stored high resolution sub-pixels. The memory offset value is determined by the display controller (115) as locations in the first and second high resolution buffers (136, 137) are allocated. The memory offset value gives the offset value with reference to the addresses stored in the address buffer (138).

The high resolution sub-pixel data that is stored in the first and/or second high resolution buffers (136, 137) is used to generate composite data defining the final color of an edge pixel when it is rendered by the display monitor (112). In other words, the color data of each of the high resolution sub-pixels corresponding to an edge pixel is averaged together by the display controller (115) to produce the color data for the corresponding location of the edge pixel in the low resolution buffer (113). The display controller (115) writes the new averaged color data into the color data field of the low resolution buffer (113) that is associated with the particular edge pixel.

The geometry that is to be rendered often includes overlapping polygons each having edges with different slopes. Hence, in some instances, a particular pixel location in the final image that is to be rendered may correspond to an edge portion of a first polygon that is to be rendered at the first high resolution, an edge portion of a second polygon that is to be rendered at the second high resolution, and a non-edge portion of a third polygon that is to be rendered at the low resolution. However, for Z-test and color data generation purposes, it is often desirable for all of the fragments that are generated that correspond to a particular pixel location to have the same resolution. For example, if a first edge pixel located on an edge of a polygon having a slope that is close to being vertical overlaps a second edge pixel located on an edge of a polygon having a slope of 45 degrees, both edge pixels should be rendered at the higher resolution corresponding to the first edge pixel.

Hence, the display controller (115) may be configured to determine whether a pixel and/or sub-pixels corresponding to a particular pixel location are currently stored in the low resolution buffer (113) or in either of the high resolution buffers (136, 137) each time it processes an incoming fragment corresponding to the same pixel location. In some examples, the display controller (115) makes this determination by checking for the existence of a resolution bit word in the bit flag cache (105) for the particular pixel location.

If it is determined that a low resolution pixel corresponding to the particular pixel location is currently stored in the low resolution buffer (113) or that a group of high resolution sub-pixels is currently stored in either of the high resolution buffers (136, 137), the display controller (115) compares the incoming fragment to the already stored pixel or sub-pixels.

If an incoming fragment has a particular resolution, and a group of high resolution sub-pixels corresponding to the same pixel location has already been rendered and stored at a higher resolution, the fragment splitter (135) copies the incoming fragment into a number of high resolution fragments corresponding to the current higher resolution sub-pixels at that location.

However, if a fragment corresponding to the same pixel location has already been rendered at a lower resolution than the incoming fragment and stored as a pixel or group of sub-pixels in the low resolution buffer (113) or first high resolution buffer (136), the already stored pixel or group of sub-pixels is used to create a new fragment that is input into the fragment splitter (135) and copied into a number of high resolution fragments corresponding to the higher resolution of the incoming fragment. The pixel location is then marked as having the higher resolution. In this manner, all of the fragments corresponding to a particular pixel location in the final image that is to be rendered have the same resolution.

By way of example, if an incoming fragment has the first high resolution, and a group of high resolution sub-pixels corresponding to the same pixel location has already been rendered at the second high resolution and stored in the second high resolution buffer (137), the incoming fragment is input into the fragment splitter (135) and copied into a number of higher resolution fragments having the second high resolution. The newly rendered fragments are then stored in the second high resolution buffer (137). In some alternative embodiments, the newly created fragments are placed in the input queue of the display controller.

However, if the incoming fragment has the second high resolution, and a group of high resolution sub-pixels corresponding to the same pixel location has already been rendered at the first high resolution and stored in the first high resolution buffer (136), the already stored sub-pixels are used to create new fragments that are input into the fragment splitter (135) and copied into a number of higher resolution fragments having the second high resolution. Once the already stored sub-pixels have been rendered at the second high resolution, they are stored as sub-pixels in the second high resolution buffer (137). In some embodiments, the sub-pixel data stored in the first high resolution buffer (136) may be erased and released for re-use after it has been rendered at the second high resolution and stored in the second high resolution buffer (137).

As mentioned, the fragment splitter (135) is configured to process fragments and render them at a higher resolution. It will be recognized that the fragments input into the fragment splitter (135) may have any resolution and that the fragment splitter (135) may be configured to render the input fragments at any higher resolution. For example, a two by two array of fragments may be input into the fragment splitter (135) and transformed into a four by four array of fragments.

The fragment splitter (135) may be included within an ASIC, FPGA, DSP, or some other type of IC. It may additionally or alternatively be integrated into the display controller (115) or the polygon rendering system's (104) IC. In some examples, the fragment splitter (135) assigns the same color and Z-distance data to each of the copied fragments. However, the fragment splitter (135) may be configured to operate in any manner as best serves a particular application.

The color data values of each of the sub-pixels stored in the first and/or second high buffers (136, 137) may then be averaged together by the display controller (115) to produce the color data for an anti-aliased edge pixel. The display controller (115) may then write the new averaged color data value into the color data field of the low resolution buffer (113) that is associated with the edge pixel.

Figure 13A:
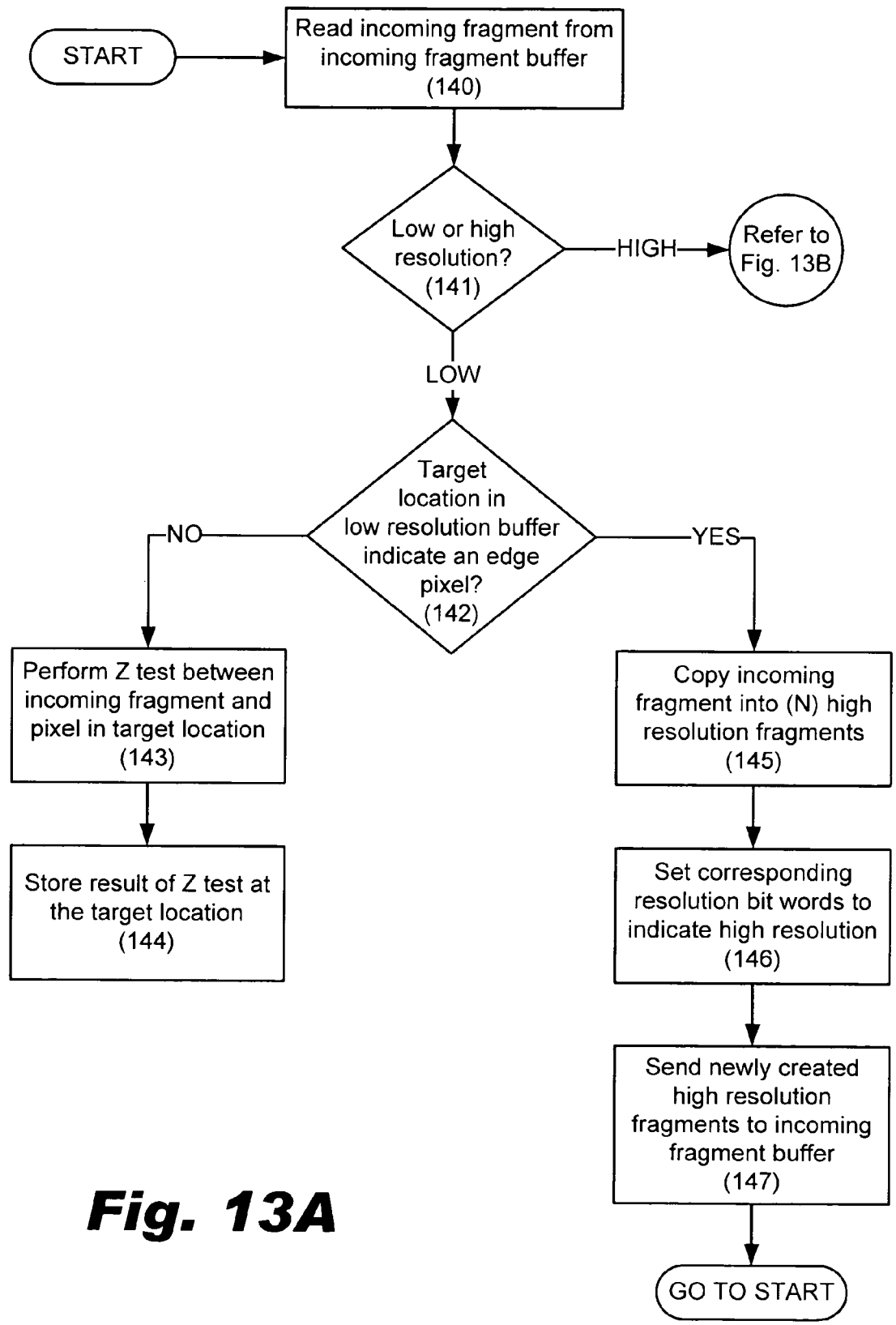
FIGS. 13A-13C is a flow chart illustrating an exemplary method of selectively rendering each edge pixel in an image at any of a number of different resolutions according to principles described herein.
Figure 13B:
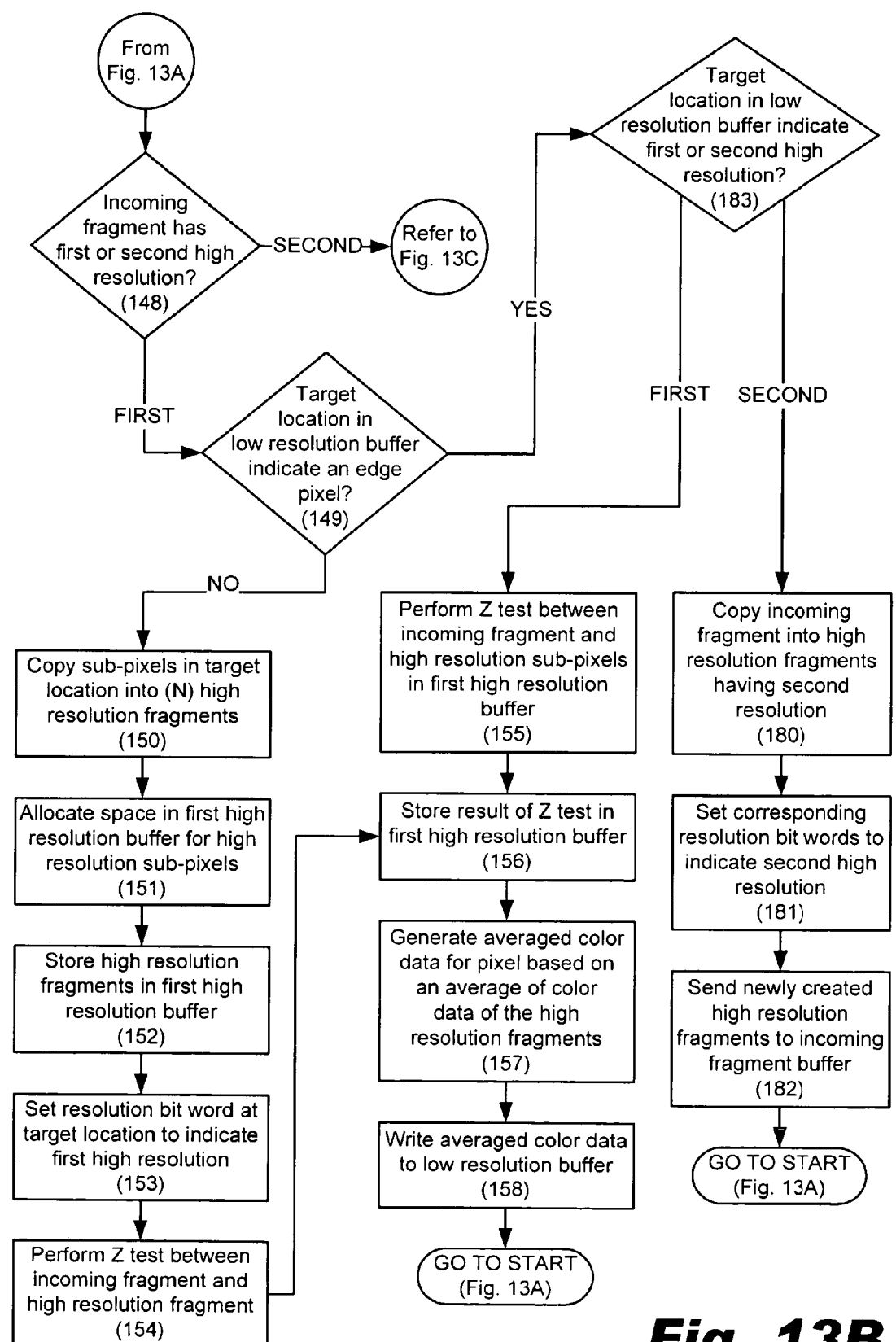
Figure 13C:
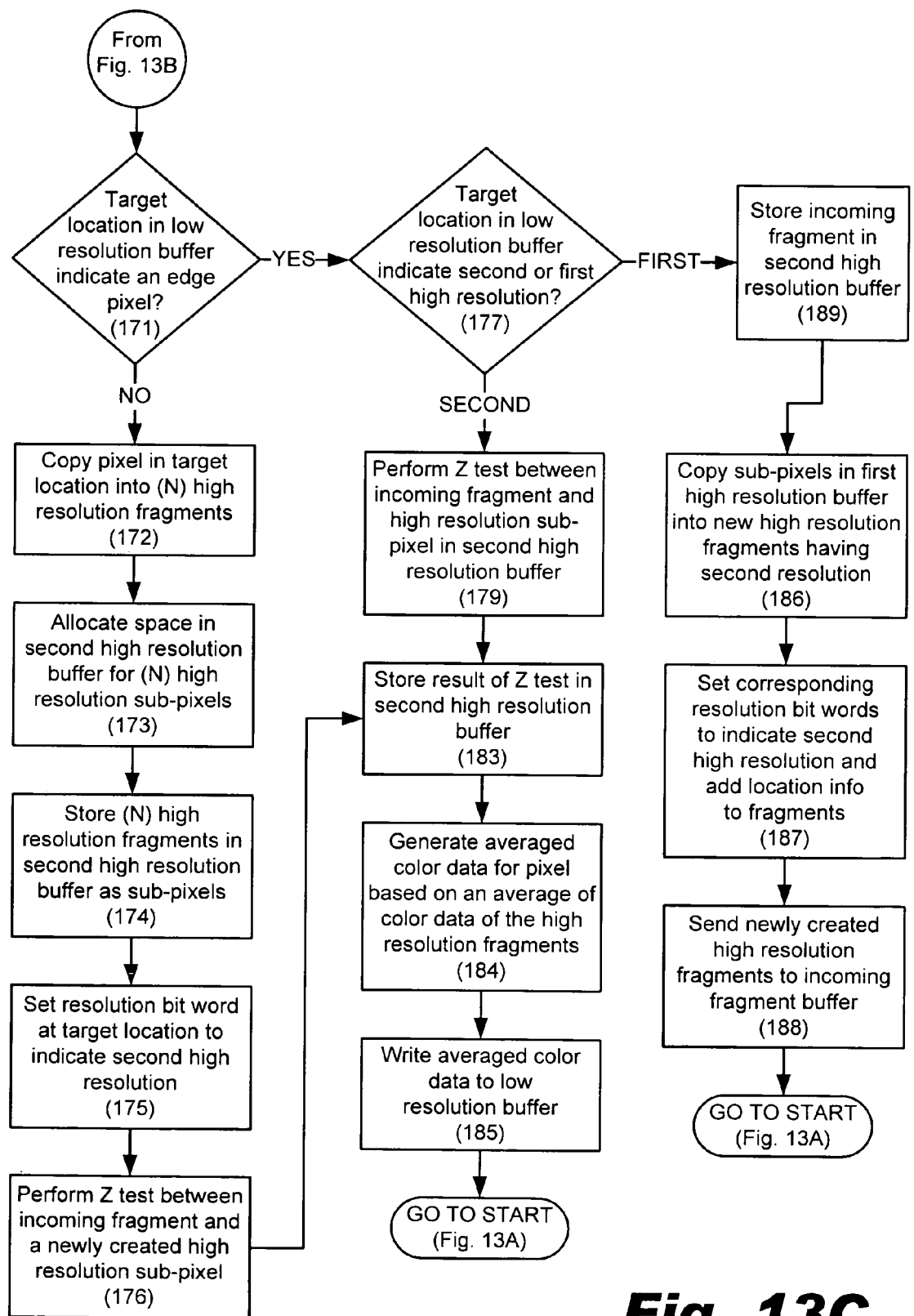

FIGS. 13A-13C show a flow chart illustrating an exemplary method of selectively rendering each pixel in an image at any of a number of different resolutions. The steps shown in FIGS. 13A-13C are merely illustrative and may be modified, added to, rearranged, or removed as best serves a particular application. Moreover, the steps shown in FIGS. 13A-13C may performed by a processor or the like via a set of computer readable instructions. These computer readable instructions may be constructed in any programming language, such as C, Verilog, or VHDL, for example, and stored on any medium configured to store computer readable instructions such as a compact disk CD, DVD, floppy disk, or hard drive, for example. The method illustrated in FIGS. 13A-13C may additionally or alternatively be implemented using an ASIC, FPGA, DSP, or some other type of IC.

As shown in FIG. 13A, a processor reads the incoming fragment that has been generated by the rasterizer unit (102; FIG. 1A), including its associated resolution bit word and Z value, from an incoming fragment buffer (118; FIG. 12) (step 140). The processor may be included within the display controller (115; FIG. 12) or any other suitable processing unit. If the resolution bit word indicates that the fragment is a low resolution fragment (Low; step 141), the processor may then compare the incoming fragment with a pixel that may already be stored in the low resolution buffer (113; FIG. 12) or a sub-pixel already stored in either of the high resolution buffers (136, 137; FIG. 12). If a low pixel is already stored in the target location of the low resolution buffer (113; FIG. 12) and if the incoming fragment is associated with a non-edge pixel (No; step 142), the processor performs a Z test between the incoming fragment and the pixel already stored in the target location (step 603). The result of the Z test is then stored in the target location (step 604).

The Z test compares the Z distances of the incoming fragment and the pixel already stored in the target location. If the incoming fragment has a Z distance that is greater than the pixel currently stored in the target location, the incoming fragment is discarded or ignored. If the incoming fragment has a smaller Z-distance, the incoming fragment replaces the current pixel in the target location in the low resolution buffer (113; FIG. 12).

However, if the target location indicates that high resolution sub-pixels corresponding to an edge pixel are already stored in one of the high resolution buffers (136, 137; FIG. 12) (Yes; step 142), the incoming fragment is copied into N high resolution fragments (step 145). For example, if four high resolution sub-pixels corresponding to an edge pixel are already stored in the first high resolution buffer (136; FIG. 12), the incoming fragment is copied into four high resolution fragments. Likewise, if eight high resolution sub-pixels corresponding to an edge pixel are already stored in the second high resolution buffer (137; FIG. 12), the incoming fragment is copied into eight high resolution fragments. Corresponding resolution bit word(s) are also set to indicate that the pixel location now has the higher resolution (step 146). The newly created high resolution fragments and their corresponding resolution bit words are then sent back to the incoming fragment buffer (118; FIG. 12) (step 147) so that they can be processed as if they had been originally rendered at that resolution.

Returning to step 141, if the resolution bit word of the incoming fragment indicates that the incoming fragment is a high resolution fragment (High; step 141), the incoming fragment may then be processed as shown in FIG. 13B. First, the processor determines whether the incoming fragment has been rendered at the first or second high resolution (step 148). If the incoming fragment has the first high resolution (First; step 148), the processor determines whether the target location in the low resolution buffer (113; FIG. 12) indicates that an edge pixel is already associated with the target location (step 149). If the target location in the low resolution buffer (113; FIG. 12) indicates that a group of high resolution sub-pixels has already been stored in the first high resolution buffer (136; FIG. 12) (Yes; step 149 and First; step 183), the processor performs a Z test between the incoming fragment and its corresponding high resolution sub-pixel in the first high resolution buffer (136; FIG. 12) (step 155). The result of the Z test is stored in the first high resolution buffer (step 156) as a sub-pixel.

The processor may then generate new color data for the low resolution pixel based on an average of the color data of the high resolution sub-pixels stored in the first high resolution buffer (136; FIG. 12) (step 157). The new averaged color data is then written to the low resolution buffer (step 158), as described previously.

However, if the target location in the low resolution buffer (113; FIG. 12) indicates that a group of high resolution sub-pixels has already been stored in the second high resolution buffer (137; FIG. 12) (Yes; step 149 and Second; step 183), the incoming fragment is copied into higher resolution fragments having the second resolution (step 180). Corresponding resolution bit words are set to indicate that the fragments now have the second high resolution (step 181). The newly created high resolution fragments are then sent back to the incoming fragment buffer (118; FIG. 12) (step 182) so that they can be processed as if they had been originally generated at that resolution.

Returning to step 149, if the target location in the low resolution buffer (113; FIG. 12) indicates that a fragment associated with a non-edge pixel is already stored in the low resolution buffer (110; FIG. 12) (No; step 149), the pixel at the target location is used to create a fragment that is copied into a number of high resolution fragments (step 150) corresponding to the first high resolution. The pixel location is then marked as having the first high resolution. For example, if the incoming fragment is one of four high resolution fragments corresponding to an edge pixel, the pixel that is already stored in the low resolution buffer (113; FIG. 12) is used to generate a fragment that is copied into four high resolution fragments of the first high resolution. This step may be performed by the processor or by any other processing unit, such as the fragment splitter (135; FIG. 12). The processor then allocates space in the first high resolution buffer (136; FIG. 12) (step 151) and stores the newly created high resolution fragments therein (step 152) as sub-pixels. The resolution bit word at the target location in the low resolution buffer (110; FIG. 12) may also be set to indicate that high resolution sub-pixels are now stored in the first high resolution buffer (step 153).

A Z test may then be performed between the incoming fragment and a corresponding high resolution sub-pixel in the first high resolution buffer (136; FIG. 12) (step 154). The result of the Z test is stored in the first high resolution buffer (136; FIG. 12) (step 156). As described previously, the processor may then generate new color data for the low resolution pixel based on an average of the color data of the high resolution sub-pixels stored in the first high resolution buffer (136; FIG. 12) (step 157). The new averaged color data is then written to the low resolution buffer (step 158).

Returning to step 148, if the incoming fragment has the second high resolution (Second; step 148), the fragment is processed as shown in FIG. 13C. The processor first determines whether the target location in the low resolution buffer (113; FIG. 12) indicates that an edge pixel is already associated with the target location (step 171). If the target location in the low resolution buffer (113; FIG. 12) indicates that a group of high resolution sub-pixels has already been stored in the second high resolution buffer (137; FIG. 12) (Yes; step 171 and Second; step 177), the processor performs a Z test between the incoming fragment and its corresponding high resolution sub-pixel in the second high resolution buffer (137; FIG. 12) (step 179). The sub-pixel selected for the Z test is based on the position mask associated with the fragment. The result of the Z test is stored in the second high resolution buffer (step 183) as a sub-pixel.

The processor may then generate new color data for the low resolution pixel based on an average of the color data of the high resolution sub-pixels stored in the second high resolution buffer (137; FIG. 12) (step 184). The new averaged color data is then written to the low resolution buffer (step 185), as described previously.

However, if the target location in the low resolution buffer (113; FIG. 12) indicates that a group of high resolution sub-pixels has already been stored in the first high resolution buffer (136; FIG. 12) (Yes; step 171 and Second; step 177), the incoming fragment is stored as a sub-pixel in the second high resolution buffer (137; FIG. 12) (step 189). The stored high resolution sub-pixels in the first high resolution buffer (136; FIG. 12) are copied into a set of higher resolution fragments having the second resolution (step 186). Corresponding resolution bit words are set to indicate that the fragments now have the second high resolution and location information is added to the fragments (step 187). The newly created high resolution fragments, including their corresponding resolution bit words, are then sent back to the incoming fragment buffer (118; FIG. 12) (step 188) so that they can be processed as if they had been originally generated at that resolution.

Returning to step 171, if the target location in the low resolution buffer (113; FIG. 12) indicates that a pixel associated with a non-edge pixel is already stored in the low resolution buffer (110; FIG. 12) (No; step 171), the pixel in the target location is used to generate a fragment that is copied into a number of high resolution fragments (step 172) corresponding to the second high resolution. For example, if the incoming fragment is one of eight high resolution fragments corresponding to an edge pixel, the pixel that is already stored in the low resolution buffer (113; FIG. 12) is used to generate a fragment that is copied into eight high resolution fragments. This step may be performed by the processor or by any other processing unit, such as the fragment splitter (135; FIG. 12). The processor then allocates space in the second high resolution buffer (137; FIG. 12) (step 173) and stores the newly created high resolution fragments as sub-pixels therein (step 174). The resolution bit word at the target location in the low resolution buffer (110; FIG. 12) may also be set to indicate that newly-stored sub-pixels are now stored in the second high resolution buffer (step 175).

A Z test may then be performed between the incoming fragment and a corresponding high resolution sub-pixel in the second high resolution buffer (137; FIG. 12) (step 176). The result of the Z test is stored in the second high resolution buffer (137; FIG. 12) (step 183). As described previously, the processor may then generate new color data for the low resolution pixel based on an average of the color data of the high resolution sub-pixels stored in the second high resolution buffer (137; FIG. 12) (step 184). The new averaged color data is then written to the low resolution buffer (step 185).

Figure 14:
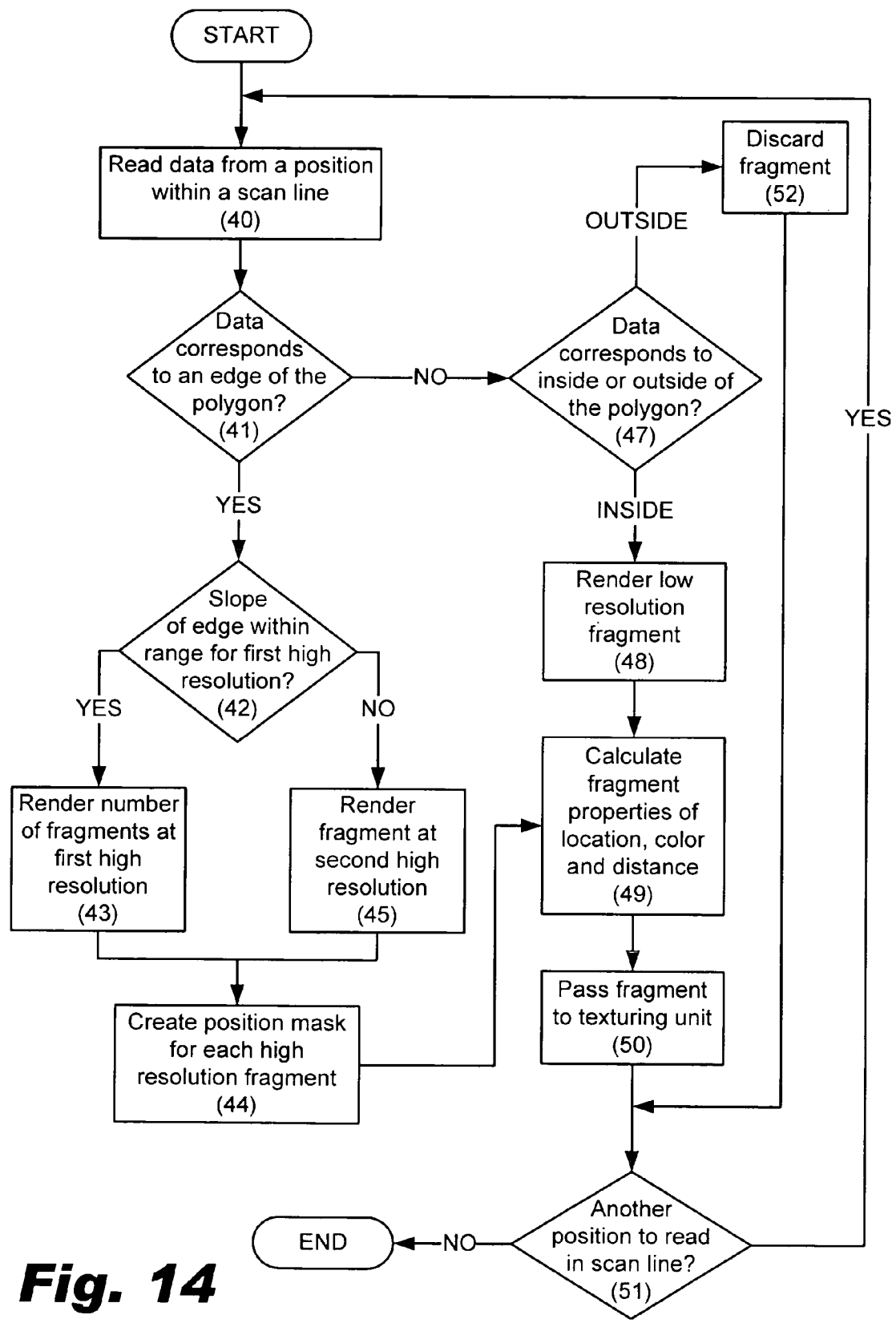
FIG. 14 is a flow chart illustrating a method of generating fragments at a low resolution, a first high resolution, and a second high resolution according to principles described herein.

FIG. 14 is a flow chart illustrating an exemplary method of generating fragments at a low resolution, a first high resolution, and a second high resolution. It will be recognized that the method of FIG. 14 may be extended to generate fragments at any number of different resolutions. The steps shown in FIG. 14 may performed by a processor or the like via a set of computer readable instructions. The steps described in FIG. 14 are exemplary and may be modified as best serves a particular application. Furthermore, the steps described in connection with FIG. 14 may be processed in any order.

As shown in FIG. 14, data from a position within a scan line of geometric data representing the polygon is first read by the rasterizer unit (102; FIG. 12) (step 40). The rasterizer unit (102; FIG. 12) then determines whether the read data corresponds to an edge of the polygon (step 41). If it does (Yes; step 31), the process moves to step 42. However, if the rasterizer unit (102; FIG. 12) determines that the data does not correspond to an edge of the polygon (No; step 41), the rasterizer unit (102; FIG. 12) then determines whether the data corresponds to a position inside or outside of the polygon (step 47). If the data corresponds to a position outside the polygon (Outside, step 47), the data is discarded (step 52) and another position is read in the scan line (Yes; step 51). If the data corresponds to a position inside the polygon (Inside, step 47), the data is rendered as a low resolution fragment (step 48). The rasterizer unit (102; FIG. 12) then calculates properties of location, color, and Z-distance (step 49) corresponding to the low resolution fragment using any suitable method. The location data represents the location within the low resolution buffer (113; FIG. 12) where the low resolution fragment is to be stored.

The newly created fragment is then passed to the texturing unit (103; FIG. 12) for further processing (step 50). It will be recognized that the fragment may additionally or alternatively be passed to any other processing unit as best serves a particular application.

Returning to step 41, if the rasterizer unit (102; FIG. 12) determines that the read data corresponds to an edge of the polygon (Yes; step 41), the rasterizer unit (102; FIG. 12) then determines whether the slope of the edge is within the range for the first high resolution (step 42). If the slope of the edge is within the range for the first resolution (Yes; step 42), the rasterizer unit (102; FIG. 12) renders a number of high resolution fragments at the first high resolution (step 43), as previously described. A position mask is then created for each high resolution fragment (step 44). The position mask describes where its corresponding high resolution fragment is to be stored in the first high resolution buffer (136; FIG. 12). The rasterizer unit (102; FIG. 12) then calculates properties of location, color, and Z-distance (step 36) corresponding to each of the high resolution fragments. The high resolution fragments may then be passed to the texturing unit (103; FIG. 12) or to any other processing unit for further processing (step 50).

However, if the slope of the edge is not within the range for the first resolution (No; step 42), the rasterizer unit (102; FIG. 12) renders a number of high resolution fragments at the second high resolution (step 45), as previously described. A position mask is then created for each high resolution fragment (step 44). The position mask describes where its corresponding high resolution fragment is to be stored in the second high resolution buffer (137; FIG. 12). The rasterizer unit (102; FIG. 12) then calculates properties of location, color, and Z-distance (step 36) corresponding to each of the high resolution fragments. The high resolution fragments may then be passed to the texturing unit (103; FIG. 12) or to any other processing unit for further processing (step 50). The steps of FIG. 14 are repeated until all of the geometric data within the scan line has been processed (No; step 51).

Figure 15:
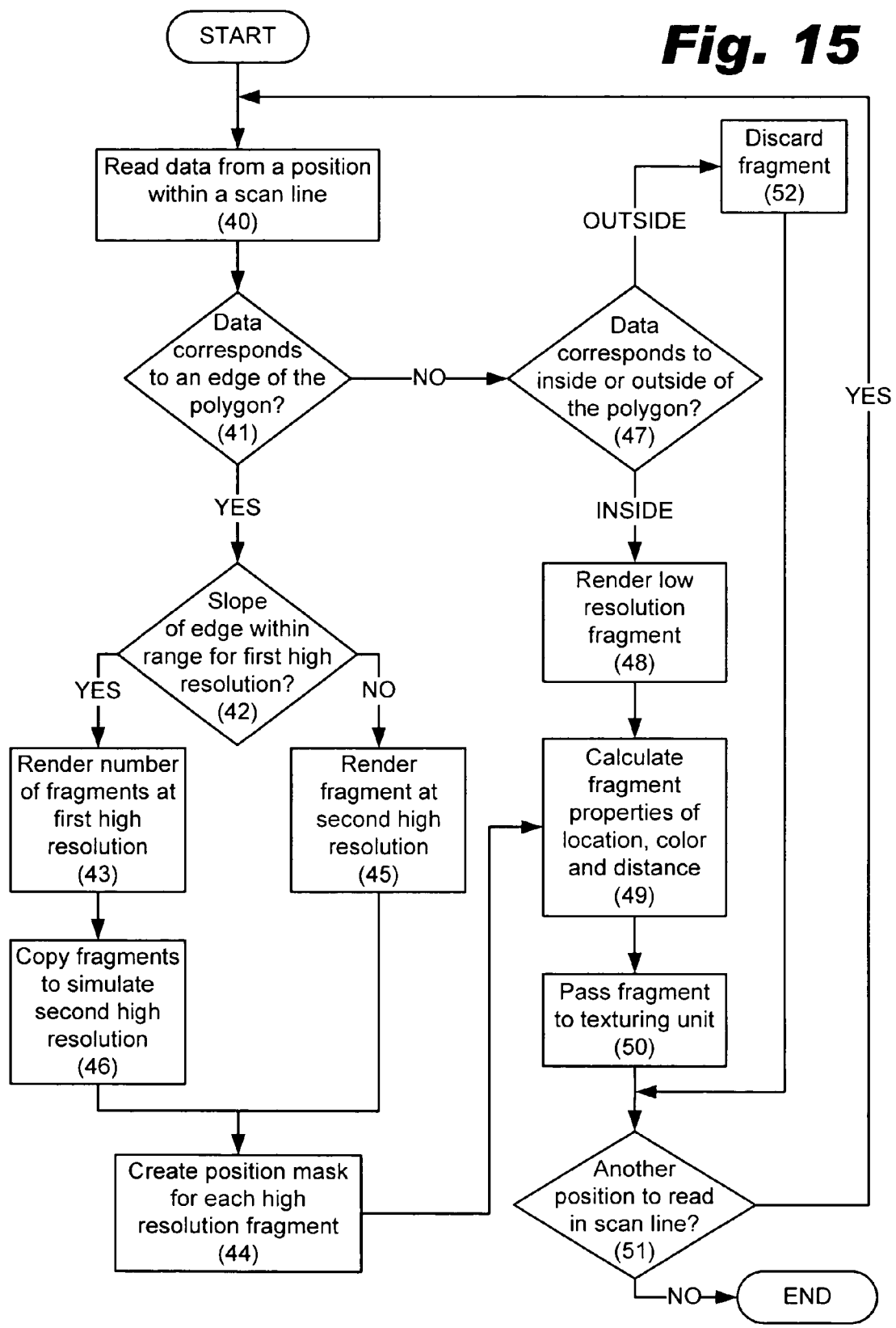
FIG. 15 is a flow chart illustrating an alternative method of generating fragments at a low resolution, a first high resolution, and a second high resolution according to principles described herein.

FIG. 15 is a flow chart illustrating an alternative method of generating fragments at a low resolution, a first high resolution, and a second high resolution. The method described in connection with FIG. 15 is substantially similar to that described in connection with FIG. 14. However, the method described in connection with 15 may be used to generate fragments at a low resolution, a first high resolution, and a second high resolution while only using one high resolution memory buffer.

Hence, as was described in connection with FIG. 14, if the rasterizer unit (102; FIG. 12) determines that the read data corresponds to an edge of the polygon (Yes; step 41), the rasterizer unit (102; FIG. 12) then determines whether the slope of the edge is within the range for the first high resolution (step 42). If the slope of the edge is within the range for the first resolution (Yes; step 42), the rasterizer unit (102; FIG. 12) renders a number of high resolution fragments at the first high resolution (step 43), as previously described. The fragments are then copied to simulate the second high resolution (step 46). This step may be performed by the fragment splitter (135; FIG. 12) or by any other suitable device. In this manner, all of the fragments may be stored in a single high resolution buffer. The other steps shown in FIG. 15 may be performed as described in more detail in connection with FIG. 14.

It will be recognized that the method of FIG. 15 may be extended to generate fragments at any number of different resolutions. The steps shown in FIG. 15 may performed by a processor or the like via a set of computer readable instructions. The steps described in FIG. 15 are exemplary and may be modified as best serves a particular application. Furthermore, the steps described in connection with FIG. 15 may be processed in any order.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A polygon rendering system for rendering a polygon in an image to be displayed, said system comprising:
   a rasterizer unit configured to generate one or more low resolution fragments representing a portion of said polygon at a first resolution and one or more high resolution fragments representing a portion of said polygon at one or more higher resolutions than said first resolution;
   a first memory buffer configured to store said low resolution fragments as pixels and data based on said one or more high resolution fragments; and
   one or more additional memory buffers configured to store said high resolution fragments as high resolution sub-pixels,
   wherein said one or more higher resolutions comprises a first high resolution and a second high resolution, wherein said second high resolution is greater than said first high resolution, and
   wherein said rasterizer unit is further configured to render an incoming fragment at said first high resolution if said incoming fragment corresponds to an edge line of said polygon having a slope within a pre-determined range and render said incoming fragment at said second high resolution if said incoming fragment corresponds to an edge line of said polygon having a slope not within said predetermined range.

2. The system of claim 1, further comprising a display controller configured to update said data in said first memory buffer based on said one or more high resolution fragments and output said data in said first memory buffer to display circuitry.

3. The system of claim 2, wherein said display controller is further configured to dynamically allocate space in said one or more additional memory buffers to store said high resolution fragments as said high resolution sub-pixels.

4. The system of claim 1, wherein said data based on said one or more high resolution fragments comprises a memory offset value indicating an address of said high resolution sub-pixels in said one or more additional memory buffers.

5. The system of claim 1, wherein said data based on said one or more high resolution fragments comprises a color data value for a pixel location in said image to be displayed, wherein said color data value is based on color data values of said one or more high resolution fragments that correspond to said pixel location.

6. The system of claim 1, wherein said pre-determined range is greater than or substantially equal to thirty degrees and less than or substantially equal to sixty degrees.

7. The system of claim 1, wherein said pre-determined range is user definable.

8. The system of claim 1, wherein said first high resolution is represented by a two by two array of said high resolution fragments.

9. The system of claim 1, wherein said second high resolution is represented by a four by four array of said high resolution fragments.

10. The system of claim 1, wherein said one or more additional memory buffers comprises:
    a first high resolution memory buffer configured to store high resolution fragments having said first high resolution as sub-pixels having said first high resolution; and
    a second high resolution memory buffer configured to store high resolution fragments having said second high resolution as sub-pixels having said second high resolution.

11. The system of claim 10, further comprising:
    a fragment splitter unit;
    wherein, if a group of said high resolution fragments having said first high resolution and corresponding to a particular pixel location in said image is already stored as high resolution sub-pixels in said first high resolution memory buffer and an incoming fragment corresponding to said particular pixel location has said second high resolution, said fragment splitter is configured to copy said already stored group of high resolution sub-pixels into a number of high resolution fragments having said second high resolution.

12. The system of claim 1, further comprising:
    a fragment splitter unit;
    wherein if a number of said high resolution fragments corresponding to a particular pixel location in said image are already stored in said one or more additional memory buffers as high resolution sub-pixels, said fragment splitter is configured to copy an incoming fragment corresponding to said pixel particular location into a number of high resolution fragments equal to said number of already stored high resolution fragments.

13. The system of claim 1, further comprising:
    a fragment splitter unit;
    wherein, if one of said low resolution fragments corresponding to a particular pixel location in said image is already stored in said first memory buffer as a pixel and an incoming fragment corresponding to said particular pixel location has one of said one or more higher resolutions, said fragment splitter is configured to copy said already stored low resolution pixel fragment into a number of high resolution fragments having said one of said one or more higher resolutions.

14. The system of claim 1, further comprising an address buffer for storing a starting address of said one or more additional memory buffers.

15. The system of claim 1, wherein said first memory buffer comprises a number of data fields corresponding to a number of pixel locations in said image, wherein said number of data fields comprises:
- a first field for each of said pixel locations configured to store a resolution bit word corresponding to each of said pixel locations, said resolution bit word indicating a resolution of pixels that are stored for each of said pixel locations;
- a second field for each of said pixel locations configured to store a color data value corresponding to each of said pixel locations; and
- a third field for each of said pixel locations configured to store a Z-distance value for each of said pixel locations.

16. The system of claim 1, wherein said data based on said one or more high resolution fragments comprises an averaged color data value based on color data values of one or more of said high resolution fragments.

17. The system of claim 1, wherein said first memory buffer and said one or more additional memory buffers are integrated into a single physical memory unit.

18. The system of claim 1, wherein said first memory buffer and said one or more additional memory buffers are separate physical memory units.

19. The system of claim 1, wherein said one or more additional memory buffers comprises a single memory buffer.

20. The system of claim 1, further comprising a bit flag cache configured to store a resolution bit word corresponding to each pixel location in said image to be displayed, wherein said resolution bit word is updated to contain a current resolution of each of said pixel locations.

21. A method of rendering a polygon in an image to be displayed, said method comprising:
- generating one or more low resolution fragments representing a portion of said polygon at a first resolution and one or more high resolution fragments representing a portion of said polygon at one or more higher resolutions than said first resolution;
- storing said low resolution fragments as pixels and data based on said one or more high resolution fragments in a first memory buffer; and
- storing said high resolution fragments as high resolution sub-pixels in one or more additional memory buffers,
- wherein said one or more higher resolutions comprises a first high resolution and a second high resolution, wherein said second high resolution is greater than said first high resolution, and
- further comprising:
- rendering an incoming fragment at said first high resolution if said incoming fragment corresponds to a pixel on an edge line having a slope within a pre-determined range and rendering said incoming fragment at said second high resolution if said incoming fragment corresponds to a pixel on an edge line having a slope not within said predetermined range.

22. The method of claim 21, further comprising updating said data in said first memory buffer based on said one or more high resolution fragments and outputting said data in said first memory buffer to display circuitry.

23. The method of claim 21, further comprising dynamically allocating space in first and second high resolution memory buffers to store said high resolution fragments.

24. The method of claim 23, further comprising writing a memory offset value in said first memory buffer indicating an address of said high resolution sub-pixels in said first and second high resolution memory buffers.

25. The method of claim 21, further comprising computing a color data value for a pixel location in said image to be displayed, wherein said color data value is based on color data values of said one or more high resolution sub-pixels that correspond to said pixel location.

26. The method of claim 21, wherein said pre-determined range is greater than or substantially equal to thirty degrees and less than or substantially equal to sixty degrees.

27. The method of claim 21, wherein said pre-determined range is user definable.

28. The method of claim 21, wherein said first high resolution is represented by a two by two array of said high resolution fragments.

29. The method of claim 21, wherein said second high resolution is represented by a four by four array of said high resolution fragments.

30. The method of claim 21, further comprising:
- storing high resolution fragments having said first high resolution as sub-pixels having said first resolution in a first high resolution memory buffer; and
- storing high resolution fragments having said second high resolution as sub-pixels having said second high resolution in a second high resolution memory buffer.

31. The method of claim 21, wherein, if a group of said high resolution fragments having said first high resolution and corresponding to a particular pixel location in said image is already stored as high resolution sub-pixels in said first high resolution memory buffer and an incoming fragment corresponding to said particular pixel location has said second high resolution, said method further comprises copying said already stored group of high resolution sub-pixels into a number of high resolution fragments having said second high resolution.

32. The method of claim 21, wherein, if a number of said high resolution fragments corresponding to a particular pixel location in said image are already stored as high resolution sub-pixels in first and second high resolution memory buffers, said method further comprises copying an incoming fragment corresponding to said pixel particular location into a number of high resolution fragments equal to said number of already stored high resolution sub-pixels.

33. The method of claim 21, wherein, if one of said low resolution fragments corresponding to a particular pixel location in said image is already stored in said first memory buffer as a pixel and an incoming fragment corresponding to said particular pixel location has one of said first and second high resolutions, said method further comprises copying said already stored low resolution fragment into a number of high resolution fragments having said one of said first and second high resolutions.

34. The method of claim 21, further comprising storing a starting address of first and second high resolution memory buffers in an address buffer.

35. The method of claim 21, further comprising storing a resolution bit word corresponding to each pixel location in said image to be displayed in a bit flag cache, wherein said resolution bit word is updated to contain a current resolution of each of said pixel locations.

36. A medium storing computer readable instructions for rendering a polygon in an image to be displayed, the instructions comprising:
- computer usable program code configured to generate one or more low resolution fragments representing a portion of said polygon at a first resolution and one or more high resolution fragments representing a portion of said polygon at one or more higher resolutions than said first resolution;

computer usable program code configured to store said low resolution fragments as pixels and data based on said one or more high resolution fragments in a first memory buffer; and computer usable program code configured to store said high resolution fragments as high resolution sub-pixels in one or more additional memory buffers, wherein said one or more higher resolutions comprises a first high resolution and a second high resolution, wherein said second high resolution is greater than said first high resolution, and the computer usable program code further comprises computer usable program code configured to:

render an incoming fragment at said first high resolution if said incoming fragment corresponds to an edge line of said polygon having a slope within a pre-determined range; and render said incoming fragment at said second high resolution if said incoming fragment corresponds to an edge line of said polygon having a slope not within said pre-determined range.

37. The medium of claim 36, wherein the computer usable program code further comprises computer usable program code configured to update said data in said first memory buffer based on said one or more high resolution fragments.

38. The medium of claim 36, wherein the computer usable program code further comprises computer usable program code configured to:

store high resolution fragments having said first high resolution in a first high resolution memory buffer as sub-pixels having said first high resolution; and store high resolution fragments having said second high resolution a second high resolution memory buffer as sub-pixels having said second high resolution.

39. The medium of claim 38, wherein, if a group of said high resolution fragments having said first high resolution and corresponding to a particular pixel location in said image is already stored as sub-pixels in said first high resolution memory buffer and an incoming fragment corresponding to said particular pixel location has said second high resolution, said computer usable program code is further configured to copy said already stored group of high resolution sub-pixels into a number of high resolution fragments having said second high resolution.

40. The medium of claim 36, wherein, if a number of said high resolution fragments corresponding to a particular pixel location in said image are already stored as high resolution sub-pixels in said one or more additional memory buffers, said computer usable program code is further configured to copy an incoming fragment corresponding to said pixel particular location into a number of high resolution fragments equal to said number of already stored high resolution fragments.

41. The medium of claim 36, wherein, if one of said low resolution fragments corresponding to a particular pixel location in said image is already stored in said first memory buffer as a pixel and an incoming fragment corresponding to said particular pixel location has one of said first and second high resolutions, said computer usable program code is further configured to copy said already stored low resolution fragment into a number of high resolution fragments having said one of said one or more higher resolutions.

42. A system for rendering a polygon in an image to be displayed, said system comprising:

means for generating one or more low resolution fragments representing a portion of said polygon at a first resolution and one or more high resolution fragments representing a portion of said polygon at one or more higher resolutions than said first resolution;

means for storing said low resolution fragments as pixels and data based on said one or more high resolution fragments in a first memory buffer;

means for storing said high resolution fragments as high resolution sub-pixels in one or more additional memory buffers;

means for rendering an incoming fragment at said first high resolution if said incoming fragment corresponds to an edge line of said polygon having a slope within a pre-determined range; and means for rendering said incoming fragment at said second high resolution if said incoming fragment corresponds to an edge line of said polygon having a slope not within said predetermined range.

43. The system of claim 42, further comprising means for updating said data in said first memory buffer based on said one or more high resolution fragments and outputting said data in said first memory buffer to display circuitry.

44. The system of claim 42, wherein said one or more higher resolutions comprises a first high resolution and a second high resolution, wherein said second high resolution is greater than said first high resolution.

45. The system of claim 42, further comprising:

means for storing high resolution fragments having said first high resolution as sub-pixels having said first resolution in a first high resolution memory buffer; and means for storing high resolution fragments having said second high resolution as sub-pixels having said second high resolution in a second high resolution memory buffer.

46. The system of claim 45, wherein, if a group of said high resolution fragments having said first high resolution and corresponding to a particular pixel location in said image is already stored as high resolution sub-pixels in said first high resolution memory buffer and an incoming fragment corresponding to said particular pixel location has said second high resolution, said system further comprises means for copying said already stored group of high resolution sub-pixels into a number of high resolution fragments having said second high resolution.

47. The system of claim 42, wherein, if a number of said high resolution fragments corresponding to a particular pixel location in said image are already stored in said one or more additional memory buffers as high resolution sub-pixels, said system further comprises means for copying an incoming fragment corresponding to said pixel particular location into a number of high resolution fragments equal to said number of already stored high resolution sub-pixels.

48. The system of claim 42, wherein, if one of said low resolution fragments corresponding to a particular pixel location in said image is already stored in said first memory buffer as a pixel and an incoming fragment corresponding to said particular pixel location has one of said one or more higher resolutions, said system further comprises means for copying said already stored low resolution fragment into a number of high resolution fragments having said one of said one or more higher resolutions.

* * * * *